United States Patent
Notohara et al.

(10) Patent No.: US 6,626,002 B1
(45) Date of Patent: Sep. 30, 2003

(54) CONTROLLER FOR PWM/PAM MOTOR, AIR CONDITIONER, AND METHOD OF MOTOR CONTROL

(75) Inventors: Yasuo Notohara, Hitachiota (JP); Yukio Kawabata, Hitachinaka (JP); Kazuo Tahara, Hitachi (JP); Makoto Ishii, Utsunomiya (JP); Yuhachi Takakura, Oyama (JP); Hiroshi Shinozaki, Shimotsuga (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/763,593

(22) PCT Filed: Jul. 29, 1999

(86) PCT No.: PCT/JP99/04071
§ 371 (c)(1),
(2), (4) Date: Feb. 26, 2001

(87) PCT Pub. No.: WO00/13302
PCT Pub. Date: Mar. 9, 2000

(30) Foreign Application Priority Data

Aug. 31, 1998 (JP) ............................................ 10-245374

(51) Int. Cl.$^7$ ............................... H02P 7/42; F25B 49/02
(52) U.S. Cl. ........................ 62/228.4; 62/230; 318/801
(58) Field of Search ............................ 62/228.4, 228.1, 62/160, 230; 318/723, 722, 715, 799, 800, 801, 803, 805

(56) References Cited

U.S. PATENT DOCUMENTS 5,605,053 A * 2/1997 Otori ..................... 62/228.4 X

FOREIGN PATENT DOCUMENTS

| JP | 59-198897 | * 11/1984 |
| JP | 63-22468 | * 9/1988 |
| JP | 64-5396 | * 1/1989 |
| JP | 5-184018 | * 7/1993 |
| JP | 6-78586 | * 3/1994 |
| JP | 6-98583 | * 4/1994 |
| JP | 6-284782 | * 10/1994 |
| JP | 7-67380 | * 3/1995 |
| JP | 7-312895 | * 11/1995 |
| JP | 8-191589 | * 7/1996 |
| JP | 9-33145 | 2/1997 |

* cited by examiner

Primary Examiner—Harry B. Tanner
(74) Attorney, Agent, or Firm—Antonelli, Terry, Stout & Kraus, LLP

(57) ABSTRACT

In a motor driving unit controlled by switching to/from PWM control from/to PAM control so that the maximum limit of motor speed can be increased and, at the same time, the unit can be operated at maximum efficiency during steady-state operation, the motor speed is controlled by maintaining the DC voltage command to the converter control circuit constant, but altering the conduction ratio command value to the inverter control circuit when the load to the motor is low, and by maintaining the conduction ratio command to the inverter control circuit constant, but altering the DC voltage command to the converter control circuit. There is a commutating phase control circuit that alters the commutating timing of the coil of the motor, and the motor is so controlled that the efficiency reaches the maximum limit during steady-state operation and the speed reaches the maximum limit during high-speed operation.

7 Claims, 19 Drawing Sheets

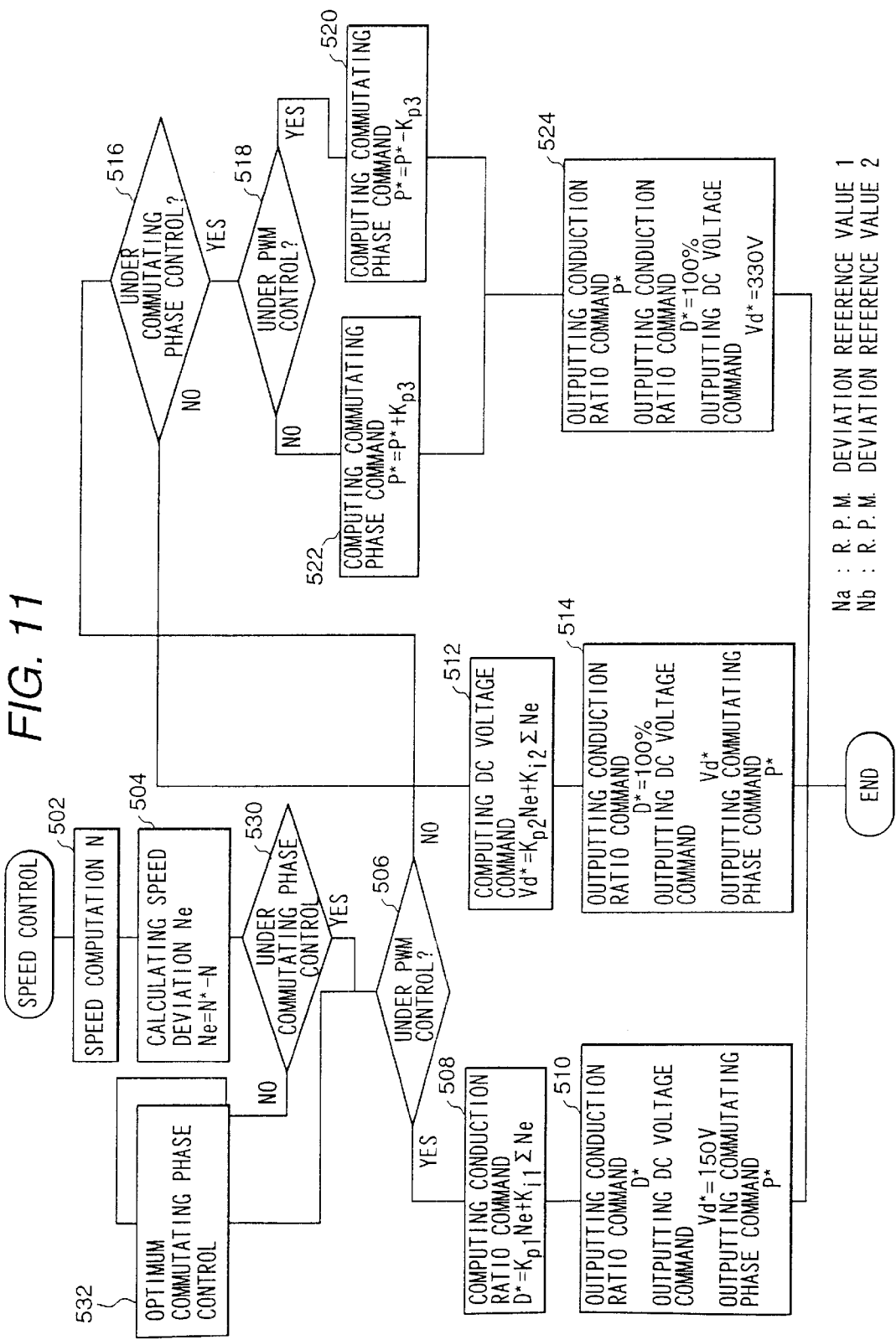

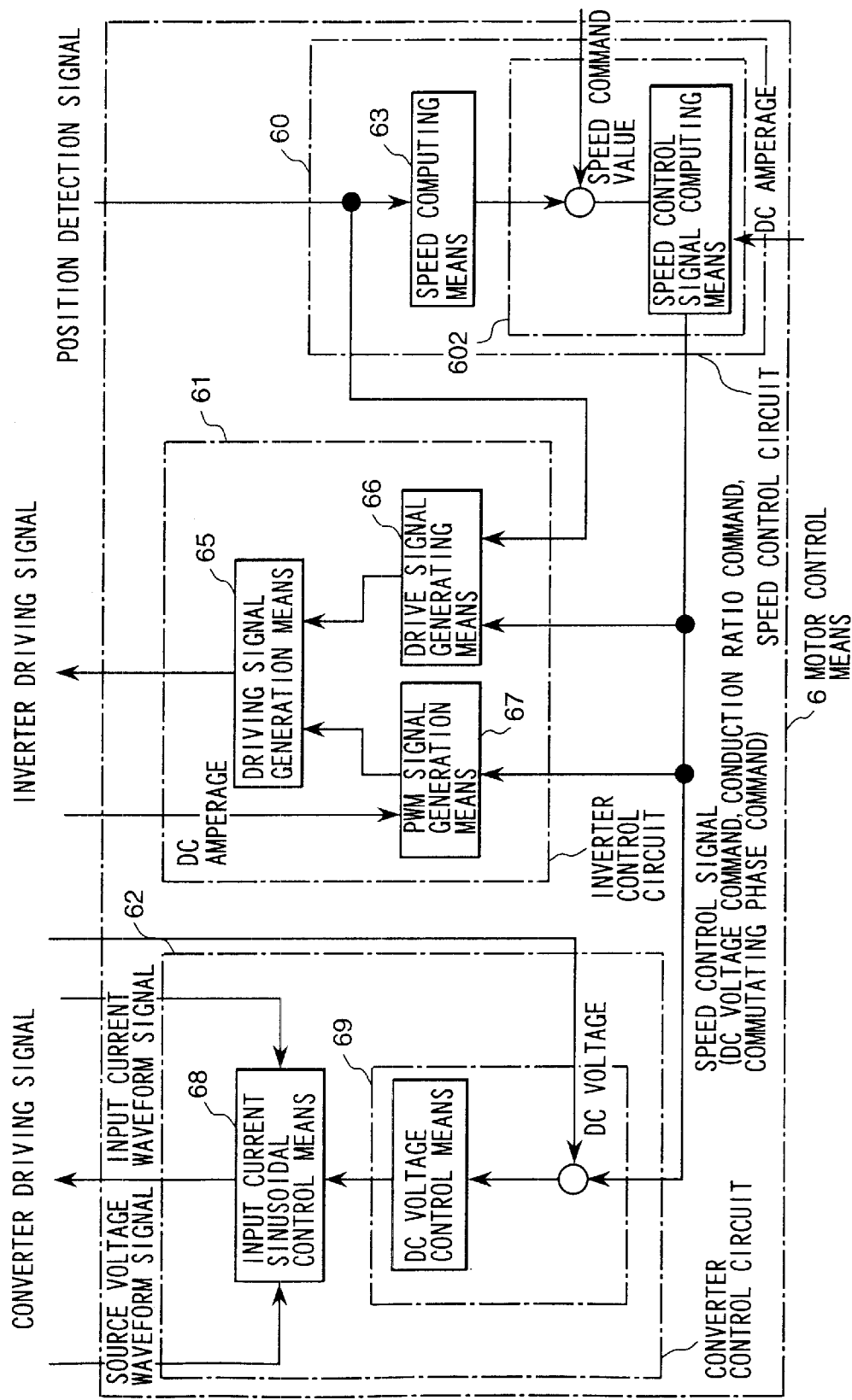

CONTROLLER FOR PWM/PAM MOTOR, AIR CONDITIONER, AND METHOD OF MOTOR CONTROL

BACKGROUND OF THE INVENTION

The present invention relates to a motor controller and to a control method for a motor, which method controls the motor speed to a desired revolution per minute (r.p.m.) while controlling the input current sinusoidally to improve the power factor and restrain harmonic current distortion; and, the invention also relates to an air-conditioner or refrigerator which employs the motor controller to drive a compressor drive motor so as to condition the air in a room.

The control method described in Japanese Application Patent Laid-Open Publication No. SHO 63-224698 (1988) is a conventional method for operation of a motor controller, which is located in a rectifying circuit that rectifies AC current and converts it to DC power and controls the speed of a motor by use of a combination of a power supply circuit for controlling the DC voltage and a motor driving circuit. This method is used to control the motor speed, when the speed is low, by means of PWM (pulse width modulation) control using the motor driving circuit; and, when the speed is high, the motor speed is controlled by means of PAM (pulse amplitude modulation) control using the DC voltage control of the power supply circuit.

The motor controller described in this J.A.P.L.O.P. No. SHO 63-224698 (1988) will be explained hereunder with reference to FIG. 23 to FIG. 25. In FIG. 23, an inverter control circuit 61 comprises a drive signal generating means 66, which outputs a drive signal for controlling the commutating action of the switching device of an inverter circuit in response to a position detection signal received from a position detection circuit; a PWM signal generation means 67, which generates a PWM signal according to a conduction ratio command, i.e. a speed control signal received from a speed control signal computing means 600; and a driving signal generation means 65, which drives the switching device of the inverter circuit 3 according to the drive signal received from the drive signal generating means 66 and a PWM signal from the PWM signal generating means 67.

A converter control circuit 62 comprises a DC voltage control means 69, which outputs a DC voltage control signal according to the deviation between a DC voltage command, i.e. a speed control signal received from the speed control signal computing means 600, and an actual DC voltage; and an input current sinusoidal control means 68, which controls the current to be inputted to the converter circuit sinusoidally by operating the switching device of a booster chopper circuit in a converter circuit according to the output of the DC voltage control means 69, a source voltage waveform signal and an input current waveform signal.

The operation of the speed control signal computing means 600 will be explained hereunder with reference to FIG. 24. This figure, in which the horizontal axis represents the motor speed (revolutions per minute) and the vertical axis represents the DC voltage command to the converter control circuit 62 and the conduction ratio command to the inverter control circuit 61, shows each operation of the DC voltage command and the conduction ratio command relative to the motor speed (revolutions per minute).

During low-speed operation, the speed control signal computing means 600 outputs a minimum DC voltage command, which is the minimum DC voltage that can control a DC voltage command in the converter circuit, and calculates a conduction ratio command so that the deviation between the speed signal received from the speed computing means 63 and the speed command value received from the outside becomes zero. This is so-called PWM control. By this control, the conduction ratio command increases in direct proportion to the revolutions per minute, as shown in FIG. 24.

During high-speed operation, on the contrary, a conduction ratio command is outputted at 100%, the maximum limit, and a DC voltage command is calculated so that the deviation between the speed signal received from the speed computing means 63 and the speed command value received from the outside becomes zero. This is so-called PAM control. By this control, the DC voltage command increases in direct proportion to the revolutions per minute, as shown in FIG. 24.

There are various methods available for switching to/from the PWM control from/to the PAM control, and one example is a method shown in FIG. 25. Switching from PWM control to PAM control, which is not described here in detail, is accomplished when the conduction ratio command reaches 100% under a condition in which a speed deviation exists and acceleration is needed. On the contrary, switching from PAM control to PWM control is accomplished when the DC voltage command reaches the minimum limit under a condition in which a speed deviation exists and deceleration is needed. By this control, the switching point shifts according to the load condition, and, consequently, stable switching becomes available.

FIG. 24 is based on a precondition that the load torque is constant, and so, if the load torque varies, the speed at which the control is switched also varies. Although the horizontal axis in FIG. 24 represents revolutions per minute, a similar curve can be obtained even if the horizontal axis represents the motor output. That is to say, in such a control method, the control system is switched according to the motor output, i.e. the motor load.

Another control method is described in Japanese Application Patent Laid-Open Publication No. HEI 7-312895 (1995) and No. HEI 8-191589 (1996), wherein the speed of a motor is controlled by PWM control during normal operation, but, after the PWM signal reaches 100% duty, the speed is controlled by the field weakening effect of the commutating phase control during high-speed operation.

According to the method described in the aforementioned J.A.P.L.O.P. No. SHO 63-224698 (1988), control of a motor can be realized in a wide operation range because the control can be switched to/from the PWM control from/to the PAM control according to the load condition. Because the motor can be operated at the minimum DC voltage under PWM control and at the reduced PWM chopper component of an inverter under PAM control, the efficiency of the motor controller can be improved overall. Besides, by employing the unit to drive a compressor of an inverter air-conditioner, it becomes possible to save energy and increase the output, and, consequently, to improve the capacity of the air-conditioner. In particular, the low-temperature heating capacity in case of a low outside temperature improves drastically.

However, under PAM control, since the speed of the motor is increased by increasing the DC voltage, it is impossible to increase the DC voltage above the withstand voltage of the inverter module device. In other words, this is the maximum speed of the motor.

According to the prior method in J.A.P.L.O.P. No. HEI 7-312895 (1995) or No. HEI 8-191589 (1996), on the other hand, the maximum speed of a motor can exceed the limit of the PWM control. However, sufficient consideration is not given to the efficiency of the motor operation under the PWM control.

Besides the above, for an air-conditioner or the like that is equipped with a motor controller employing a combination of PWM and PAM control, it is necessary not only to improve the performance, but also to reduce the cost.

SUMMARY OF THE INVENTION

An object of the present invention is to provide a motor controller and a control method for a motor, and also an air-conditioner or the like that employs the controller and/or the control method, wherein the motor speed is controlled by switching to/from the PWM control from/to the PAM control, and in which the motor can be operated always at higher efficiency and in a wider operation range.

Another object of the present invention is to provide a motor controller and a control method for a motor, and also an air-conditioner or the like that employs the controller and/or the control method, wherein the motor speed is controlled by switching to/from the PWM control from/to the PAM control, and in which much higher-speed control is available.

Another object of the present invention is to provide a motor controller and a control method for a motor, and also an air-conditioner or the like that employs the controller and/or the control method, wherein the motor speed is controlled by switching to/from the PWM control from/to the PAM control, and in which the efficiency of the motor under a low-speed operation can be increased.

Another object of the present invention is to provide a motor controller and a control method for a motor, and also an air-conditioner or the like that employs the controller and/or the control method, wherein the motor speed is controlled by switching to/from the PWM control from/to the PAM control, and in which an inverter module becomes available at lower cost.

The above object are achieved by a motor controller or a control method for a motor, said controller comprising a converter circuit that converts AC power to DC, an inverter circuit connected to the output of the converter circuit, a motor connected to the inverter circuit, and a motor control means that controls the speed of the motor. The motor control means comprises a converter control circuit and an inverter control circuit, and it controls the speed of the motor by altering a DC voltage command to the converter control circuit or a conduction ratio command to the inverter control circuit. The motor control means further comprises a commutating phase control means that alters the commutating timing of the coil of the motor, and alters the commutating phase of the coil of the motor according to the speed and load of the motor.

Another characteristic feature of the present invention resides in a motor controller or a control method for a motor, wherein the controller comprises a converter circuit that converts AC power to DC, an inverter circuit connected to the output of the converter circuit, a motor connected to the inverter circuit, and a motor control means that controls the speed of the motor. The motor control means comprises a converter control circuit and an inverter control circuit, and it controls the speed of the motor by altering a DC voltage command to the converter control circuit or a conduction ratio command value to the inverter control circuit. The motor control means further comprises a commutating phase control means that alters the commutating timing of the coil of the motor, said commutating phase control means detecting a value such as input power or DC amperage that relates to the efficiency of the motor controller and alters the commutating phase of the coil of the motor so that the efficiency of the motor controller reaches the maximum limit.

According to the present invention, in using a motor controller or a control method for a motor, wherein the motor speed is controlled by switching to/from the PWM control from/to the PAM control, the efficiency of the motor can be improved by a combination of the PWM/PAM control and independent phase control. That is, in using a motor controller or a control method for a motor, wherein the motor speed is controlled by switching to/from the PWM control from/to the PAM control, the motor can be so controlled as to be able to operate very efficiently in a wider operation range by altering the commutating timing of the coil of the motor using the commutating phase control means and controlling the motor in such a manner that the efficiency becomes the maximum in a steady operation and the speed reaches becomes the maximum limit in a high-speed operation.

The efficiency can be improved particularly by controlling the phase over the entire speed range. Control of the speed in a high-speed range is available either by altering the phase or by altering the DC voltage, and efficient operation can be achieved all the time, provided that which factor to alter is determined in view of which better improves the efficiency. Besides, a similar effect to the above can be obtained by finding an optimum phase for the highest efficiency continuously.

As a result, by applying the invention to an inverter for an air-conditioner, it becomes possible to provide an air-conditioner that has an increased cooling and heating capacity extensively and, at the same time, saves energy. In addition, because an optimum commutating phase can be searched automatically, the above air-conditioner can be provided at lower cost.

Also, according to the present invention, a high-speed operation of a motor becomes available. That is, much higher-speed control becomes available by controlling the phase, without increasing the DC voltage above 330 V. As a result, by applying the invention to an air-conditioner or refrigerator, the capacity in a transient operation, such as at the start-up or at a sudden change in the load, can be increased.

Also according to the present invention, because the design or rated speed of a motor can be decreased, the efficiency in a low-speed operation can be increased. Because the control in a high-speed range leaves some allowance provided that the maximum speed is set constant, the design point of a motor can be lowered. Because of this, the efficiency in a low-speed range can be improved. In addition, by adding the PWM/PAM control to the operation, a much higher-efficiency operation becomes available. As a result, by applying the invention to an air-conditioner or refrigerator, the efficiency in a steady-state operation range improves, thereby resulting in tremendous energy saving and drastically reduced electric energy cost in a year.

Also, according to the present invention, an inverter module becomes available at lower cost. That is, because the maximum DC voltage can be as low as 330 V or so, a standard inverter module becomes applicable, and, hence, an inverter or motor controller can be provided at lower cost. As a result, by applying the invention to an air-conditioner or refrigerator, the cost of each unit can be reduced.

BRIEF DESCRIPTION OF THE DRAWINGS

FIG. 11 is a flowchart of the speed control computation according to the second embodiment of the invention.

FIG. 13 is a block diagram of the motor control means according to a third embodiment of the invention.

DETAILED DESCRIPTION OF THE INVENTION

The first embodiment of the present invention will be explained with reference to FIG. 1 to FIG. 7.

Figure 1:
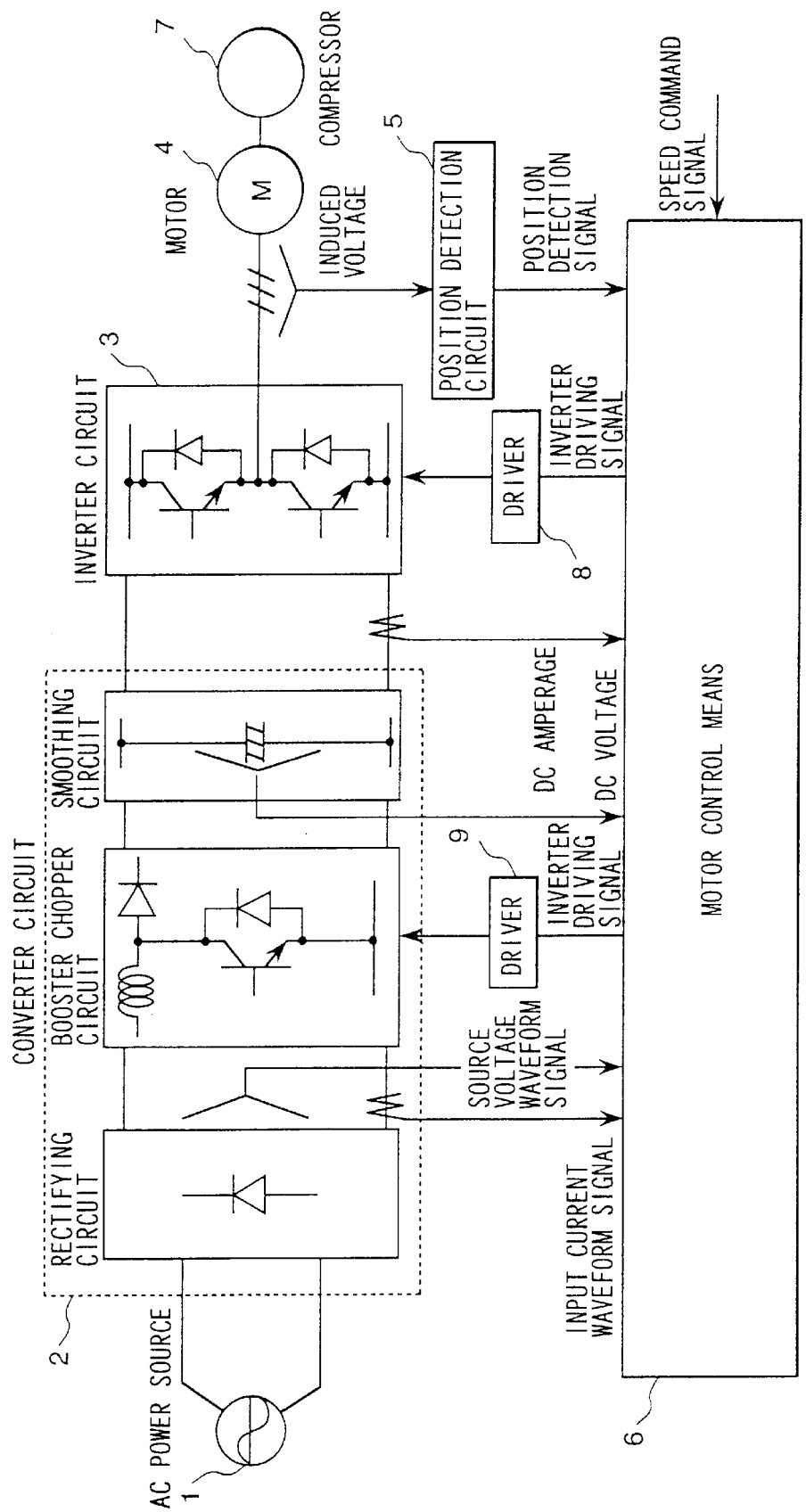
FIG. 1 is a schematic diagram of a compressor driving unit according to a first embodiment of the present invention.

FIG. 1 is an overall schematic diagram of an air-conditioner compressor driving unit to which the invention applies. The driving unit comprises a converter circuit 2, which converts the AC voltage supplied from an AC power source 1 into DC power and controls the voltage of the DC, using a rectifying circuit and a booster chopper circuit; an inverter circuit 3, which covert the DC voltage into AC power of a desired voltage; a motor control means, which controls the speed of a brushless DC motor 4 according to a speed command; a position detection circuit 5, which detects the pole position of the brushless DC motor 4; a driver 9 which drives the converter circuit 2 according to a converter driving signal from the motor control means 6; a driver 8 which drives the inverter circuit 3 according to an inverter driving signal from the motor control means 6; and a compressor 7, which is directly connected to the motor 4 and constitutes a load thereof for carrying out a heating cycle function.

Figure 2:
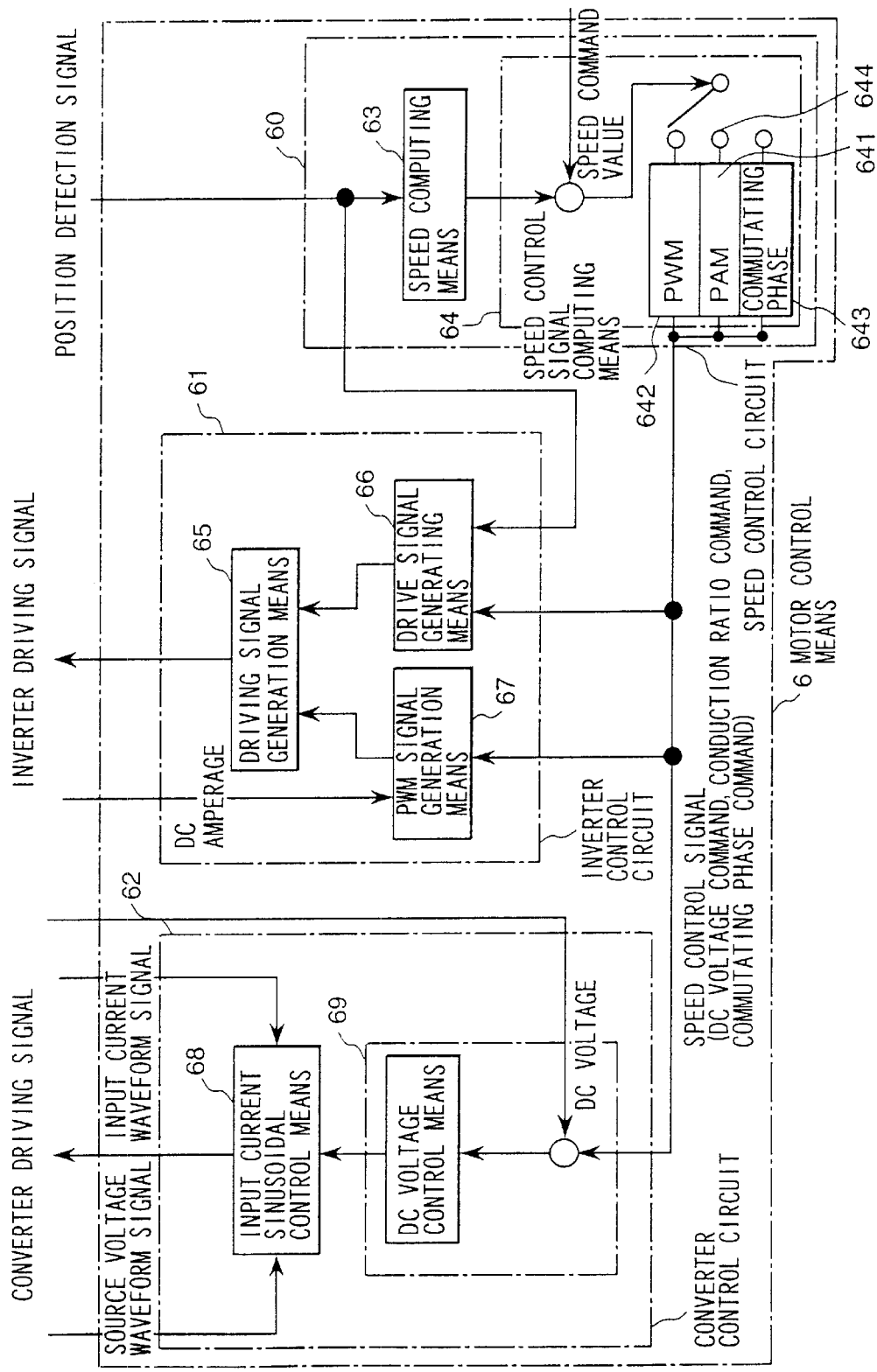
FIG. 2 is a schematic diagram of a motor control means according to the first embodiment of the invention.

FIG. 2 shows a schematic diagram of the motor control means 6 according to the first embodiment of the invention. The motor control means 6 uses a one-chip microcomputer and all control means are realized in the form of software. The motor control means 6 comprises a speed control circuit 60, an inverter control circuit 61, and a converter control circuit 62.

The speed control circuit 60 comprises a speed computing means 63 which computes the speed of the motor 4 according to a position detection signal from the position detection circuit 63, and a speed control signal computing means 64 which calculates a speed control signal from the deviation between a speed command value from the outside and a speed signal from the speed computing means 63.

The speed control signal computing means 64 comprises three signal generators: a DC voltage command section 641 which outputs a DC voltage command to the converter control circuit 62, a conduction ratio command section 642 which outputs a conduction ratio command to the inverter control circuit 61, and a commutating phase command section 643 which outputs a commutating phase command; and a switching section 644 which switches these three generators.

Figure 24:
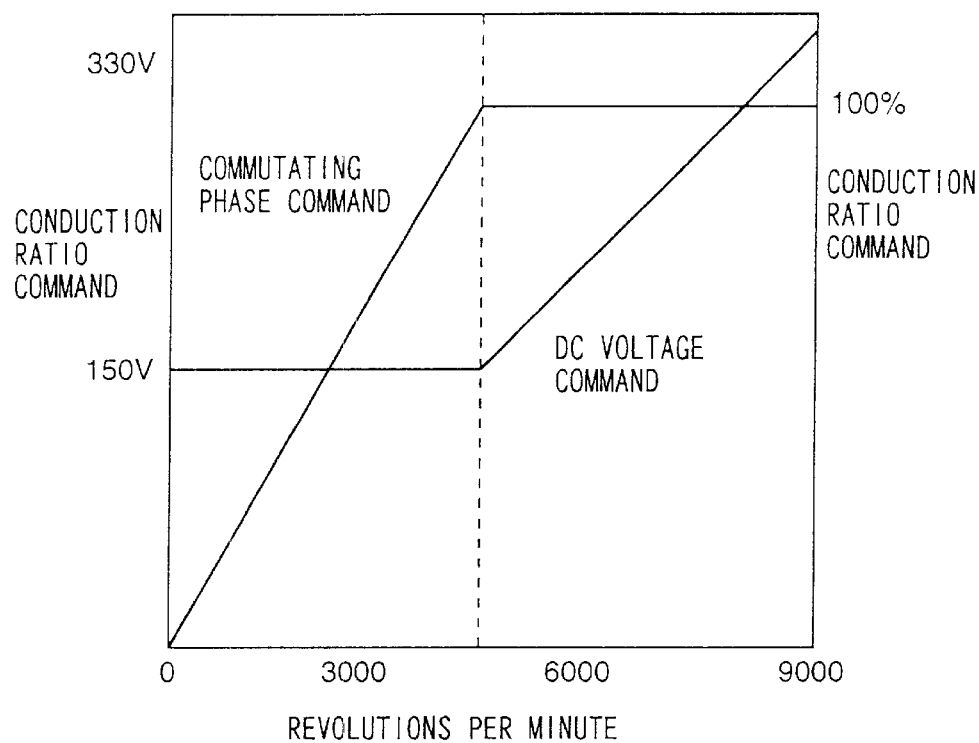
FIG. 24 is an explanatory chart showing the speed control signal computing means of the example shown in FIG. 23.
Figure 25:
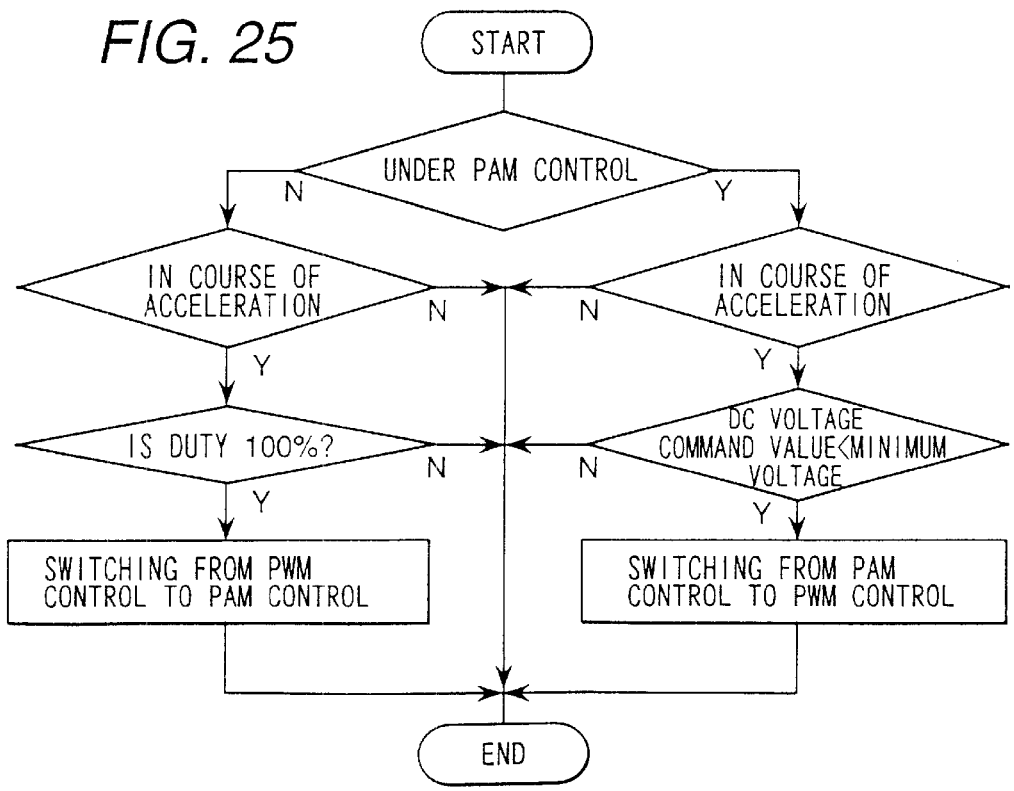
FIG. 25 is a chart showing the switching algorithm of the PWM/PAM control of the example shown in FIG. 23.

The operation of the speed control signal computing means 64 will be explained hereunder with reference to FIG. 3. This figure, as in FIG. 24, shows the operations of the DC voltage command, conduction ratio command and commutating phase command relative to motor speed (revolutions per minute). An explanation of the operations of the DC voltage command and conduction ratio command are omitted because they are similar to those operations depicted in FIG. 24.

Besides computing the DC voltage command and conduction ratio command, the speed control signal computing means 64 also computes the commutating phase command in the commutating phase command section 643. The commutating phase command, which is maintained constant under the aforementioned PWM control and PAM control, is to be altered when further acceleration is needed even after the DC voltage command reaches the maximum voltage.

Figure 4:
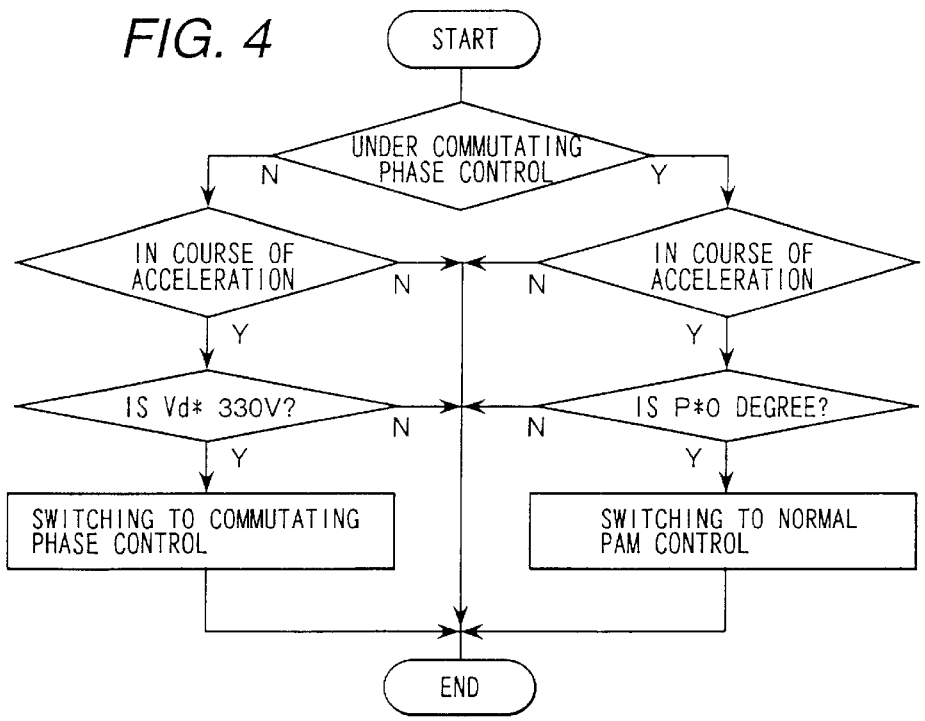
FIG. 4 is a chart showing the switching algorithm of the commutating phase control according to the first embodiment of the invention.

FIG. 4 shows the algorithm for switching to the commutating phase control, that is, the action of the switching section 644 shown in FIG. 2. The commutating phase control is carried out under a condition where the speed can no longer be controlled by the PAM control, in other words, when the DC voltage reaches the maximum limit.

Because of this, switching from the PAM control to the commutating phase control is accomplished when the DC voltage command reaches the maximum limit under a condition where a speed deviation exists and acceleration is needed. On the contrary, switching from the commutating phase control to the PAM control is accomplished when the commutating phase command reaches the minimum limit under a condition where a speed deviation exists and deceleration is needed. By this control, the switching point shifts according to the load condition and, consequently, smooth switching becomes available.

Figure 3:
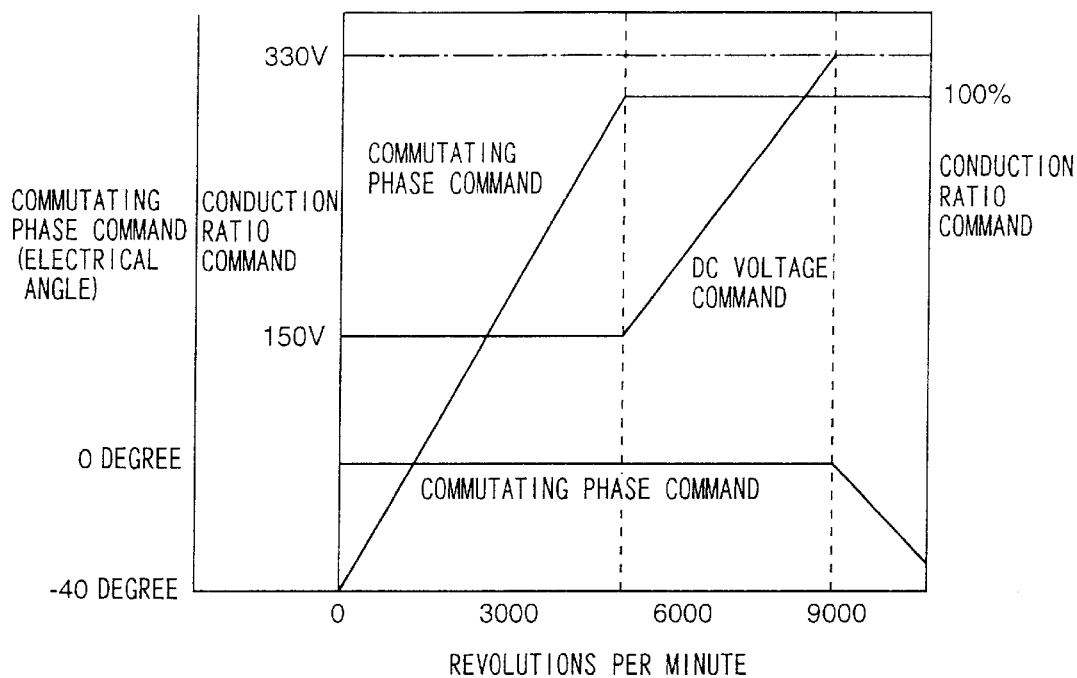
FIG. 3 is an explanatory chart showing the operation of the speed control signal computing means shown in FIG. 2.
Figure 5:
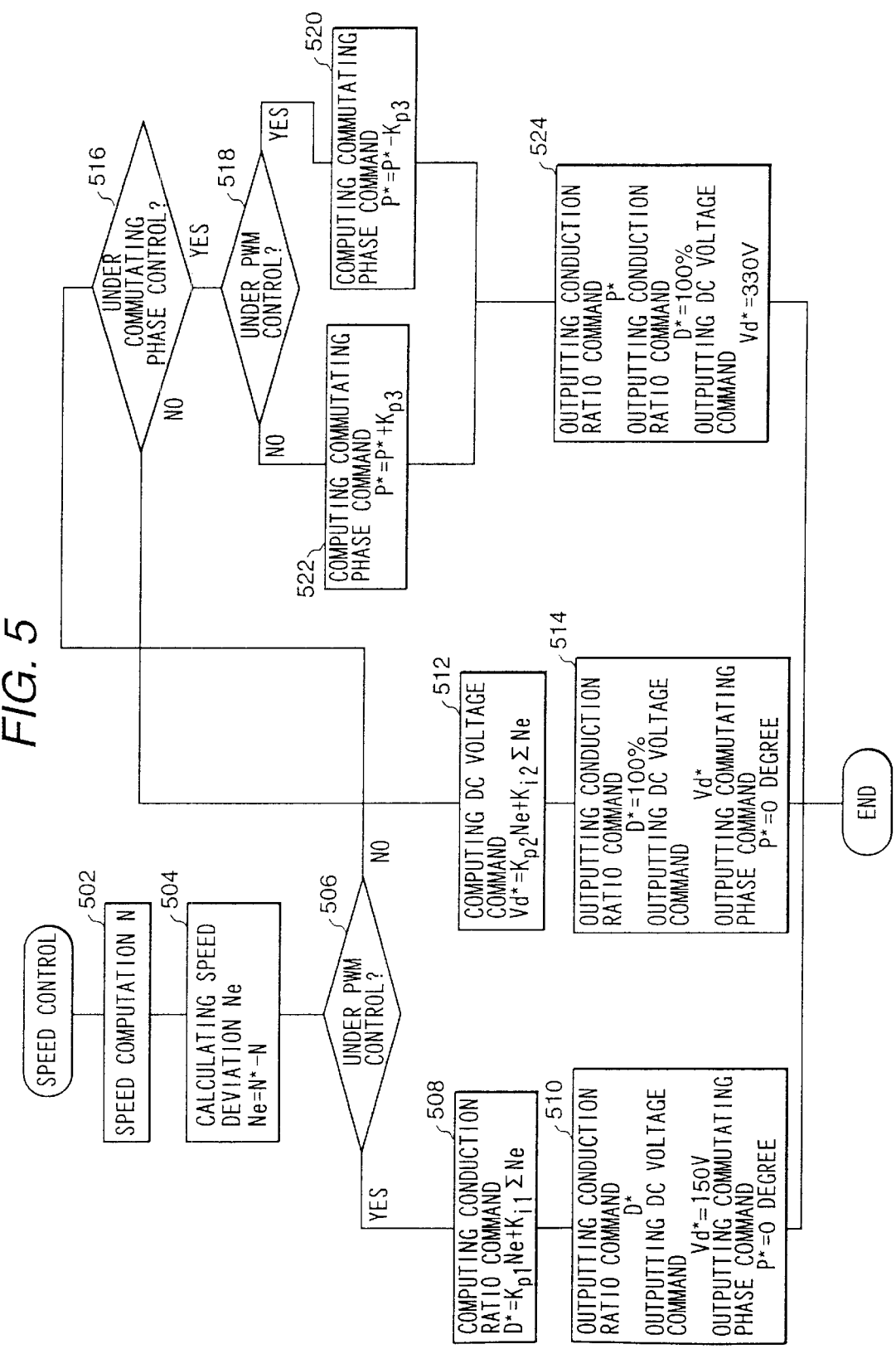
FIG. 5 is a flowchart of the speed control computation according to the first embodiment of the invention.

Next, FIG. 5 shows the flowchart of the speed control computation that makes it possible to actually achieve the speed control shown in FIG. 3. This flowchart represents a speed control processing executed in the speed control signal computing means 64. The speed control processing is executed repeatedly at a preset cycle.

The speed control processing is executed repeatedly at a preset interval. At first, the speed signal from the speed computing means 63 is read in step (502), and the speed deviation between the speed command value received from the outside and the above speed signal is calculated in step (504). The present condition of the control is checked in step (506). If it is under PWM control, the processing transaction proceeds to step (508); or, it proceeds to step (516), if under PAM control. Here, the condition of the control is judged using flags and is altered according to the algorithm shown in FIG. 4. The processing for switching the condition of the control shown in FIG. 4 is also executed inside the speed control signal computing means 600 at a preset interval cyclically.

When the transaction proceeds to step (508), where the operation is under PWM control, the conduction ratio command is computed using the speed deviation obtained in the previous step (504). Computation is executed as shown there.

After the processing in step (508) is complete, the transaction proceeds to step (510) and the calculated conduction ratio command D* is outputted to the PWM signal generating means 67. Since the operation is under PWM control in this instance, the DC voltage command is outputted at 150 V, the minimum limit, to the DC voltage control means 69. The commutating phase command value P*=0 degree is also outputted.

Then, if the operation is judged to be under PAM control in step (506) and the transaction proceeds to step (12), the DC voltage command is computed similarly as in step (508), using the speed deviation obtained in the previous step (504). Computation is executed as shown there.

After the above, the transaction proceeds to step (514) and, similarly to the above step (508), the calculated DC voltage command is outputted to the DC voltage control means 69. Since the operation is under PAM control in this instance, the commutating phase command is outputted at 100%, the maximum limit, to the PWM signal generating means 67. The commutating phase command value P*=0 degree is also outputted.

If the operation is under PAM control or commutating phase control, the transaction proceeds to step (516) and whether the operation is under the commutating phase control or not is judged. If it is under PAM control, the transaction proceeds to step (512) and the same processing as above is executed.

If the operation is under commutating phase control, the transaction proceeds to step (518) and whether the speed deviation calculated in step (504) is positive or negative is judged.

If the speed deviation is positive, that is, if acceleration is needed, the transaction proceeds to step (520) and the commutating phase command is decreased by a preset decrement. To the contrary, if the speed deviation is negative, that is, if deceleration is needed, the transaction proceeds to step (522) and the commutating phase command is increased by a preset increment.

Figure 6:
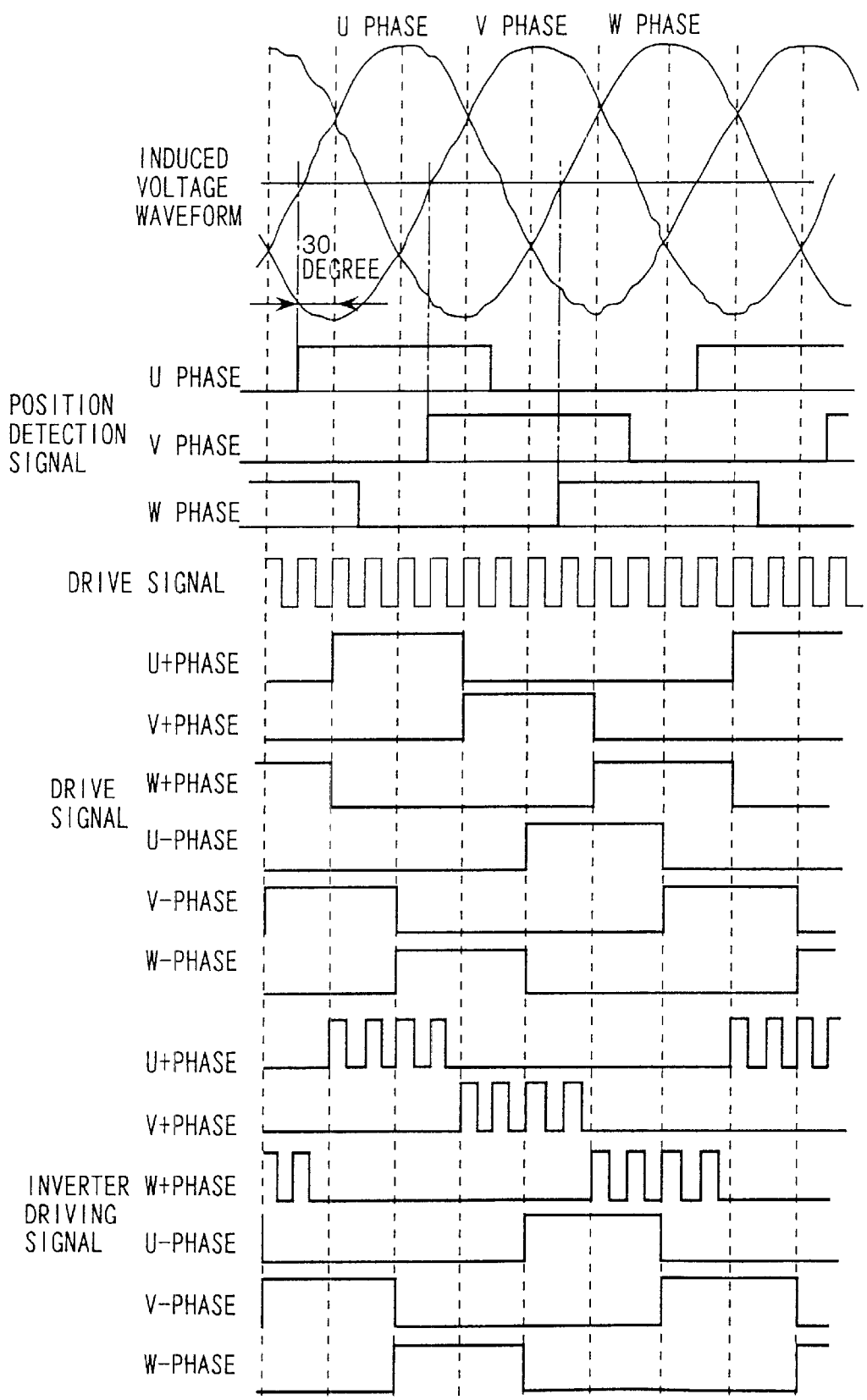
FIG. 6 is a signal diagram showing the operation of the inverter control circuit shown in FIG. 1.

In this instance, the relationship between the position detection signal and the drive signal is as shown in FIG. 6. Since the commutating phase command is a value used to calculate a delay from the change point of the position detection signal up to the time of actually changing the drive signal, as shown in FIG. 6, the smaller the value is, the further the phase leads. In other words, the smaller the commutating phase command value is, the more the speed increases.

In step (524), the commutating phase command P* calculated in the above step (520) or (522) is outputted. At the same time, the conduction ratio command D* and the DC voltage command Vd* are outputted each at the maximum limit.

By executing the above processing repeatedly, the speed control signal computing means 600 operates as shown in FIG. 4 to control the speed of the motor 4.

The drive signal producing means 66 outputs a drive signal which instructs the actuation timing and combination of the switching devices of the inverter circuit 3 according to the position detection signal from the position detection circuit 5.

Since the position detection circuit 5 described in this embodiment employs a circuit that detects a position behind the actual position of the commutating action by an electrical angle of 30 degrees, as shown in FIG. 6, the drive signal of each phase of the inverter is outputted with a delay time of an electrical angle of 30 degrees from the change point of the position detection signal. This delay is also processed in the drive signal producing means 66.

This Figure also shows each relationship between the induced voltage waveform and the position detection signal, PWM signal, and inverter driving signal.

The operation of the PWM signal generating means 67 and the driving signal generating means 65 will be explained hereunder with reference to FIG. 6.

The PWM signal generating means 67 generates a PWM signal from the conduction ratio command received from the speed control signal computing means as shown by the PWM signal in FIG. 6.

The driving signal generating means 65 processes the PWM signal received from the PWM signal generating means 67 and the drive signal from the drive signal generating means 66, as shown by the inverter driving signal in FIG. 6, by combining the two signals when each U+ phase, V+ phase, and W+ phase set on the upper arm of the inverter circuit 3 is ON. The above operation is based on a case where chopping is performed only by the upper arm.

Six inverter driving signals shown in FIG. 6 are outputted from the driving signal generating means 65 as described above.

Figure 7:
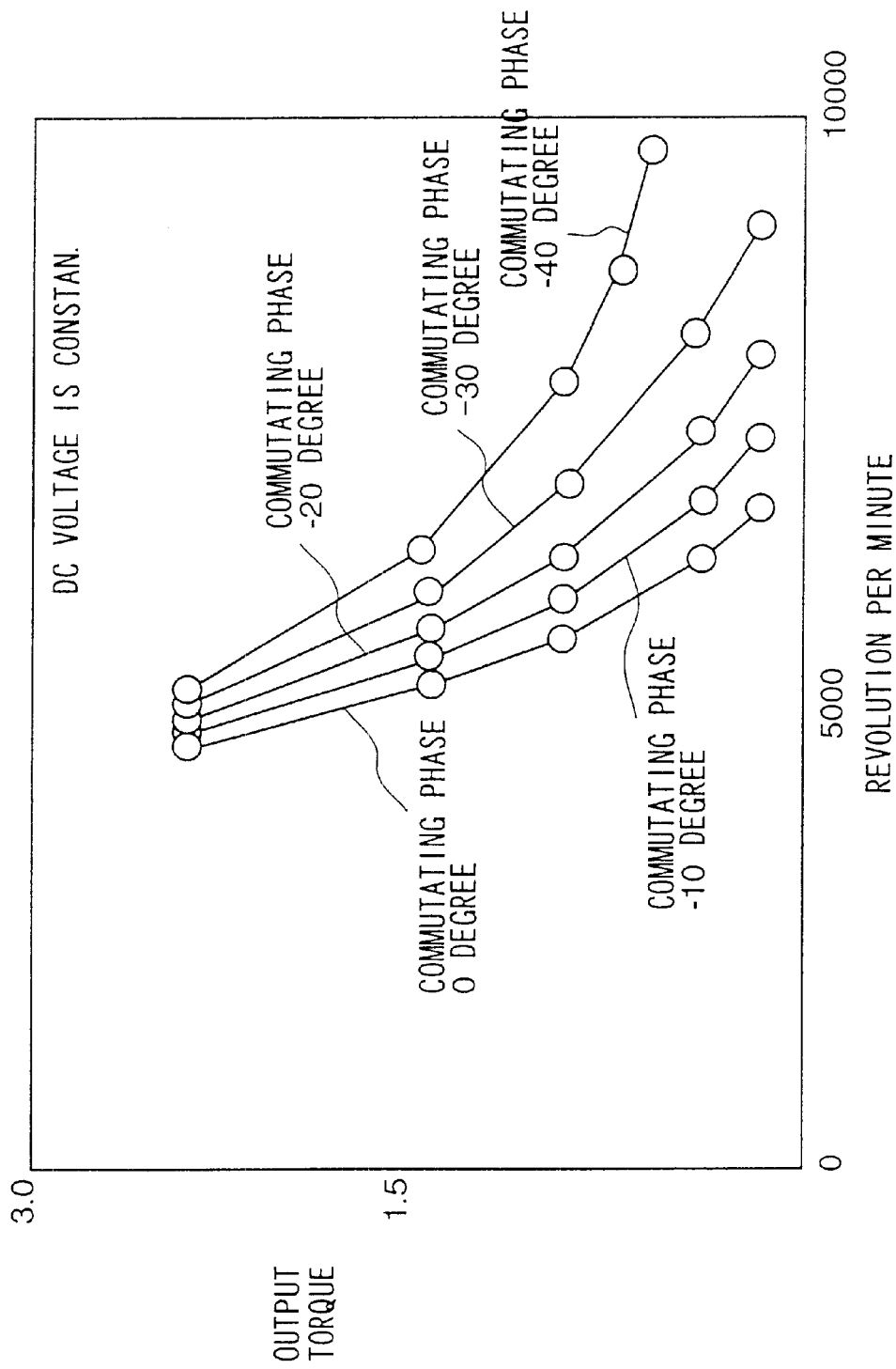
FIG. 7 is a graph of an experimental result of the relationship between the commutating phase and the maximum output according to the first embodiment of the invention.

FIG. 7 shows an experimental result of the relationship between the motor speed and the output torque of the motor at different commutating phases. As shown in FIG. 7, it is understood that, if the output torque is set constant, the speed increases as the commutating phase leads. The commutating phase control employs the motor characteristic shown in FIG. 7.

Under the PWM control and PAM control, without employing the commutating phase control, the commutating phase command P* is set to the minimum limit, as shown in steps (510) and (514) in FIG. 5. In this embodiment, the commutating phase is set at 0 degree, where no phase lead is caused.

By executing the above processing repeatedly, the speed control signal computing means 64, as shown in FIG. 3, controls the speed of the motor 4.

The drive signal producing means 66 outputs a drive signal, as does the drive signal producing means of the prior art, according to the position detection signal from the position detection circuit 5. The difference from the prior art lies in that the commutating phase command calculated in the speed control signal computing means 64 is used during the delay time from the change point of the position detection signal up to the time of actually changing the drive signal.

The foregoing description relates to the control method for a motor of a compressor driving unit according to the first embodiment of the invention.

By employing the method of this embodiment, it becomes possible to increase the motor speed without increasing the maximum DC voltage, thereby widening the control range, as compared to using the prior method. In addition, as shown in FIG. 7, the output range of a motor can also be widened by leading the commutating phase. As a result, if the present invention is applied to a driving unit of a compressor that constitutes a heating cycle and the unit is used for an air-conditioner, wherein the speed command value of the motor is computed according to the difference between the room temperature setting and the actual room temperature, and the speed of the motor is controlled according to the speed command value, the capacity can be improved.

Besides, since a low DC voltage, for example 330 V, can be used as it is in the present method, it is not necessary to increase the withstand voltage of the inverter circuit 3, and hence a motor controller can be realized at the same cost as in the prior method.

On the other hand, since the maximum limit of the DC voltage can be decreased in case the maximum motor speed is set to the same level, higher efficiency can be expected as compared to that of the prior method. Besides, in case the maximum DC voltage is also set to the same level, since a motor can be designed at a different design point so that the efficiency further improves in a low-speed range, it becomes possible to build a system that is very efficient in the normal operation range. As a result, if the method is applied to an air-conditioner, the electric energy cost per year can be reduced.

If a compressor driving unit of the present invention is employed as a driving unit for a compressor that constitutes a refrigerating cycle of a refrigerator, wherein the speed command value of the motor is computed according to the difference between the chamber temperature setting and the actual chamber temperature, and the speed of the motor is controlled according to the speed command value, a similar effect is obtained.

Next, a second embodiment of the present invention will be explained hereunder with reference to FIG. 8 to FIG. 12. This embodiment, which is almost the same as the first embodiment, is directed to a method wherein the commutating phase control is achieved also in a normal-speed range. For this reason, the internal composition of the motor control means is the same as in FIG. 2. The difference lies in that the commutating phase command, which is one of the speed control signals from the speed control signal computing means 64, varies all the time according to the motor speed.

Figure 8:
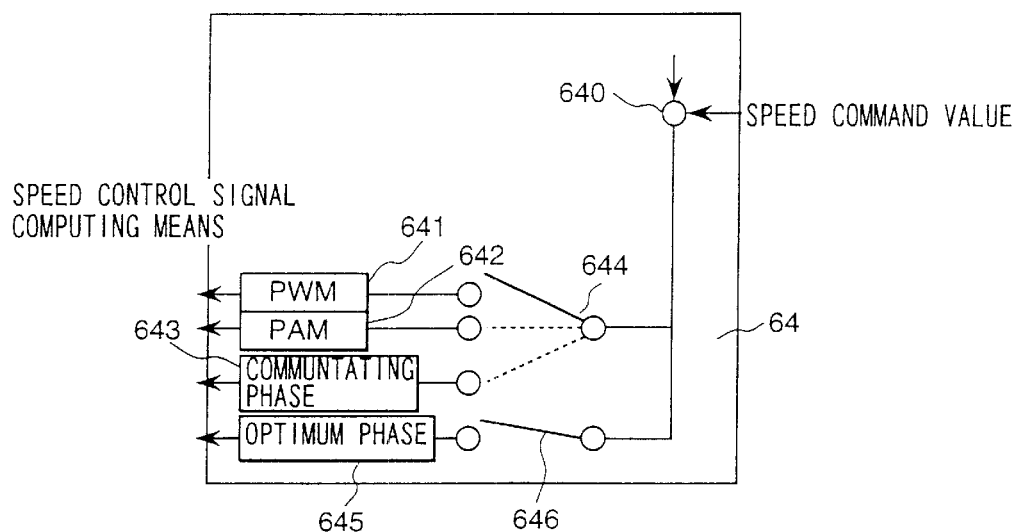
FIG. 8 is a schematic diagram of the speed control signal computing means according to a second embodiment of the invention.

That is to say, as shown in FIG. 8, the speed control signal computing means 64 comprises three signal generators: a DC voltage command section 641, which outputs a DC voltage command to the converter control circuit 62, a conduction ratio command section 642, which outputs a conduction ratio command to the inverter control circuit 61, and a commutating phase command section 643, which outputs a commutating phase command; and a switching section 644 which switches these three generators. Additionally, it includes an optimum commutating phase control section 645, which alters the commutating phase to an optimum value even when the motor is under PWM control and PAM control, and a switching section 646 is connected thereto.

Figure 9:
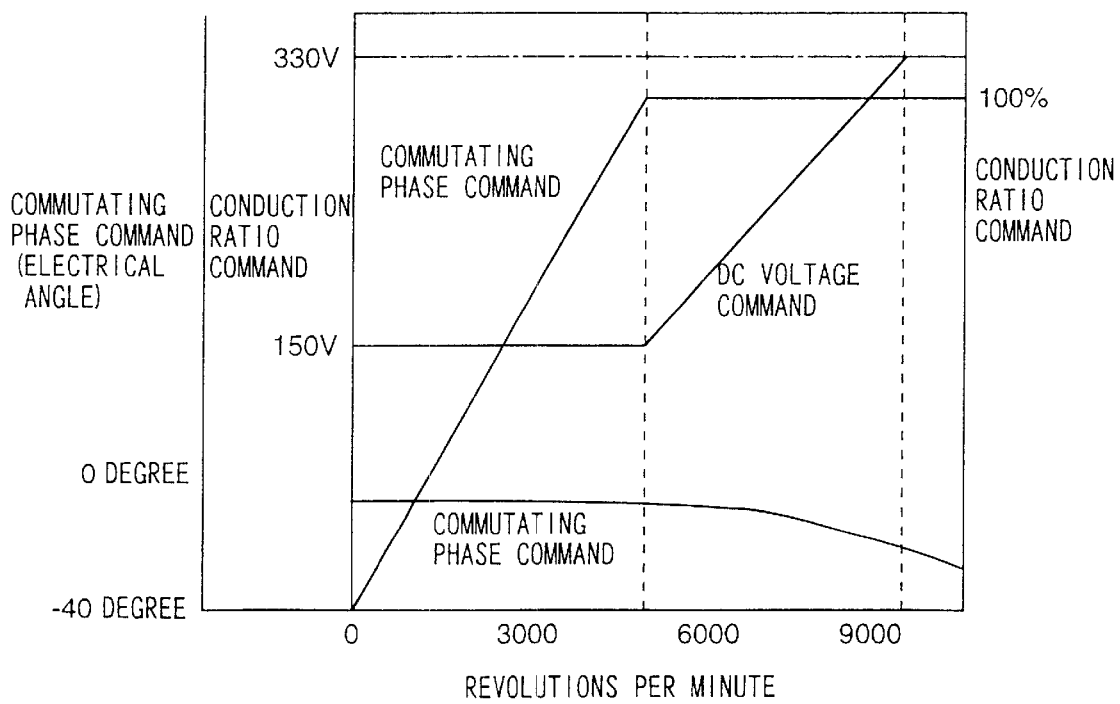
FIG. 9 is an explanatory chart showing the operation of the speed control signal computing means according to the second embodiment of the invention.

Next, the operation of the speed control signal computing means 64 will be explained. FIG. 9 shows the action of each speed control signal in this speed control method, where the horizontal axis represents the motor (revolutions per minute). The basic operation is similar to that in the first embodiment. Although, in the first embodiment, the commutating phase is altered after the DC voltage reaches the maximum limit, the commutating phase is altered also under PWM control and PAM control in this embodiment. In this explanation, the commutating phase alteration in a normal-speed range is called the optimum commutating phase control in order to distinguish it from the commutating phase control in high-speed operation.

As shown in FIG. 9, the conduction ratio command and the DC voltage command are the same as in the first embodiment, and only the commutating phase command varies throughout the operation from the low-speed range to the high-speed range. The commutating phase command to be issued throughout the operation, from the time of the motor start-up to the time the DC voltage command value reaches the maximum limit, is so calculated that the motor efficiency reaches the maximum limit.

Figure 10:
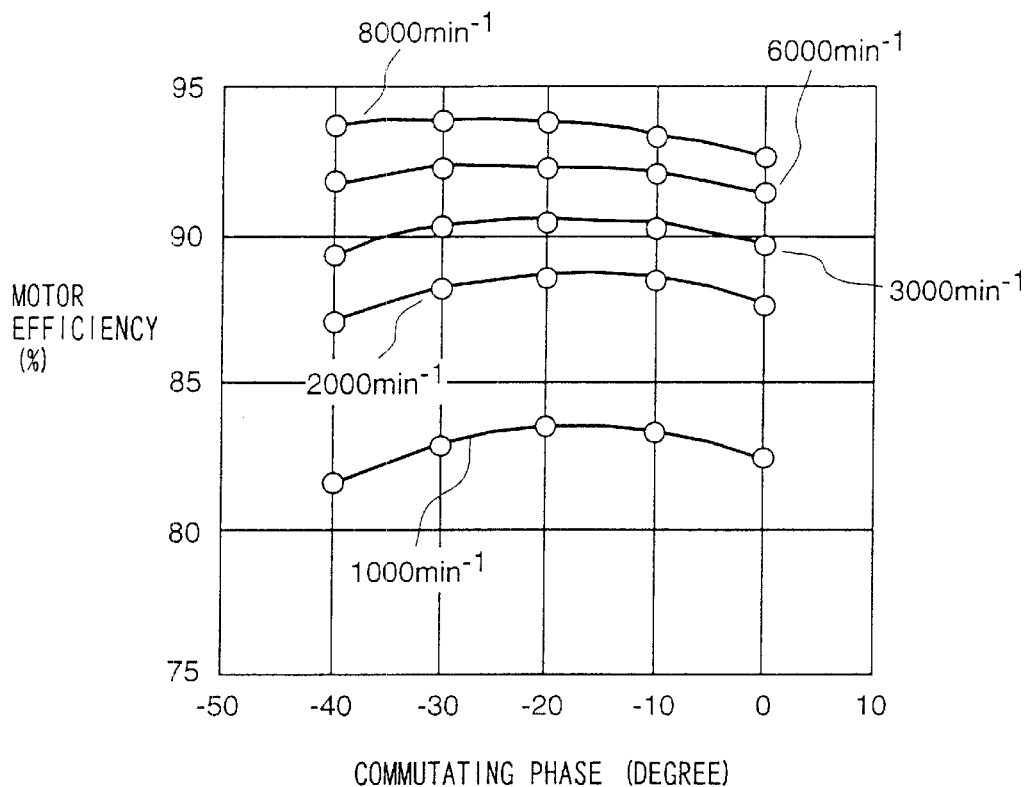
FIG. 10 is a graph showing an experimental result of the relationship between the commutating phase and the motor efficiency according to the second embodiment of the invention.

FIG. 10 shows an experimental result of the motor efficiency versus the commutating phase command, using the motor speed as a parameter. In case of the motor used in this experiment, the efficiency during low-speed operation becomes best if the commutating phase leads by an electrical angle of about 15 degrees, and it further improves in a higher-speed range, if a greater lead is provided.

In order to improve the motor efficiency, a correlation formula between the revolution per minute and the commutating phase is calculated in advance, as shown in FIG. 10, and is employed in processing the optimum commutating phase control in the optimum commutating phase control section 645 of the speed control signal computing means 64.

Figure 12B:
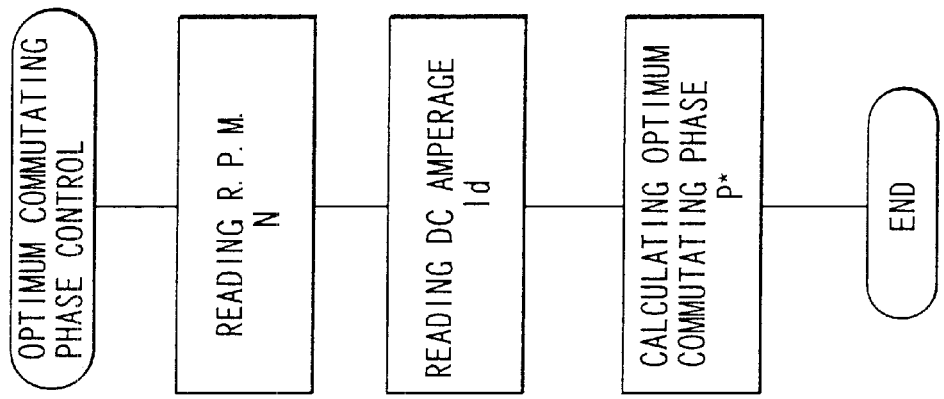
FIGS. 12(a) and 12(b) are flowcharts of examples of the optimum commutating phase control according to the second embodiment of the invention.
Figure 12A:
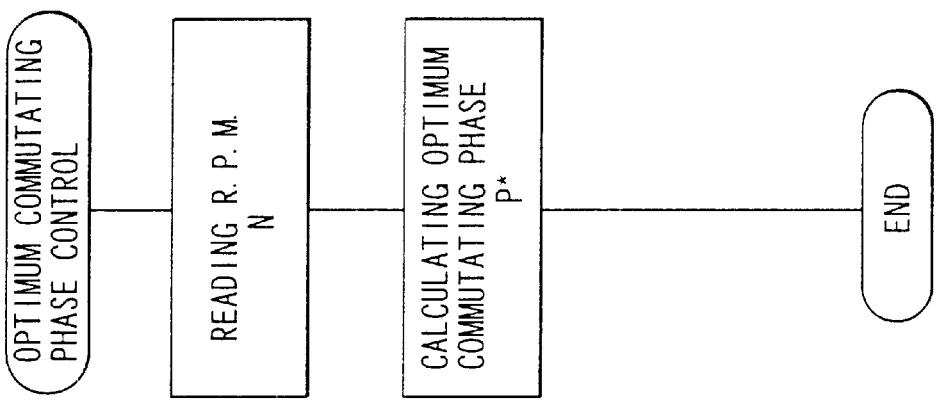

Each of FIG. 11, FIG. 12(a) and FIG. 12(b) shows a flowchart of the speed control processing executed in the speed control signal computing means. FIGS. 12(a) and 12(b) are flowcharts showing examples of two types of an internal transaction of the optimum commutating phase control processing shown in FIG. 11.

If the efficiency characteristic relative to the commutating phase of the motor is not so much affected by the load torque, it is possible to calculate the commutating phase command only on the basis of the motor speed, as shown in FIG. 12(*a*). For a motor in which the efficiency characteristic relative to the commutating phase is varied greatly by the load torque, or for a system wherein the motor characteristic is of greater importance, it is necessary to calculate the commutating phase command on the basis of both the motor speed and a value from which the load torque can be estimated, as E shown in FIG. 12(*b*), which is a flowchart of a process that is based on the DC amperage.

In both FIG. 12(*a*) and FIG. 12(*b*), it is necessary to measure the efficiency characteristic relative to the commutating phase in advance, and prepare a computation formula or table data based on the measurement result.

The speed control processing shown in FIG. 11 is almost the same as that in FIG. 5, and the same step number represent the same processing. Thus, transactions in steps (530) and (532) only will be explained hereunder.

Step (530) judges whether or not the operation is under commutating phase control as described in the first embodiment. If the operation is under commutating phase control, no optimum commutating phase control is achieved, but the transaction proceeds to step (506). If the operation is not under commutating phase control, the transaction proceeds to step (532). Step (532) is the processing shown in FIG. 12(*a*) or FIG. 12(*b*).

If two different control methods, optimum commutating phase control and commutating phase control, that require alteration of the commutating phase, are to be employed, it is necessary to change the commutating phase command smoothly in switching from/to the optimum commutating phase control range to/from the commutating phase control range.

For example, when switching from the optimum commutating phase control to the commutating phase control, the initial value of the commutating phase command for the commutating phase control shall be set to the final value of the optimum commutating phase control.

Otherwise, it is necessary to find a way, for example, for the final value of the commutating phase command for the optimum commutating phase control to be preset and for the final value to be employed as the initial value for the commutating phase control.

According to the second embodiment of the invention, the efficiency can be improved by a combination of PWM/PAM control and independent phase control. That is, in using a motor controller or a control method for a motor, wherein the motor speed is controlled by switching to/from the PWM control from/to the PAM control, the motor can be so controlled as to be able to operate very efficiently in a wider operation range by altering the commutating timing of the coil of the motor by the commutating phase control means and controlling the motor in such a manner that the efficiency reaches the maximum limit in a steady operation and that the motor speed reaches the maximum limit in a high-speed operation. The efficiency can be improved particularly by controlling the phase over the entire speed range.

As a result, by applying the second embodiment, associated with the optimum commutating phase control, to the motor control of a compressor driving unit, the motor efficiency in the steady speed range can be improved. In addition, since the commutating phase is controlled to stay at an optimum value, motor stoppage due to loss of synchronism can be prevented. By applying the controller to an inverter air-conditioner, it becomes possible to provide an air-conditioner that has a significantly increased cooling and heating capacity and, at the same time, saves energy. With this embodiment, the electric energy cost per year can be reduced much more than in the first embodiment. In addition, because an optimum commutating phase can be searched automatically, the above air-conditioner can be provided at a lower cost.

Also, according to the second embodiment of the invention, the high-speed operation of a motor becomes available. That is, much higher-speed control becomes available by controlling the phase, without increasing the DC voltage above 330 V. As a result, by applying the second embodiment of the invention to an air-conditioner or refrigerator, the capacity in a transient operation, such as at the start-up or at the time of a sudden change in the load, can be increased.

Also, according to the second embodiment of the invention, because the design or rated speed of a motor can be decreased, the efficiency in a low-speed operation can be increased. That is, because the control in a high-speed range leaves some allowance provided that the maximum motor speed is set constant, the design point of a motor can be lowered. Because of this, the efficiency in a low-speed range can be improved. In addition, by adding the PWM/PAM control to the operation, a much higher-efficiency operation becomes available.

Also, according to the second embodiment of the invention, an inverter module becomes available at a lower cost. That is, because the maximum DC voltage can be as low as 330 V or so, a standard inverter module becomes applicable, and hence, a unit can be provided at lower cost. As a result, by applying the invention to an air-conditioner or refrigerator, the cost of each unit can be reduced.

The third embodiment of the present invention will be explained hereunder with reference to FIG. 13 to FIG. 17.

FIG. 13 shows the internal composition of the motor control means 6 of FIG. 1 as applied to the third embodiment. In FIG. 13, the amperage of the DC that runs into the inverter circuit 3 is inputted into the speed control signal computing means 64 as described in connection with the second embodiment.

Figure 14:
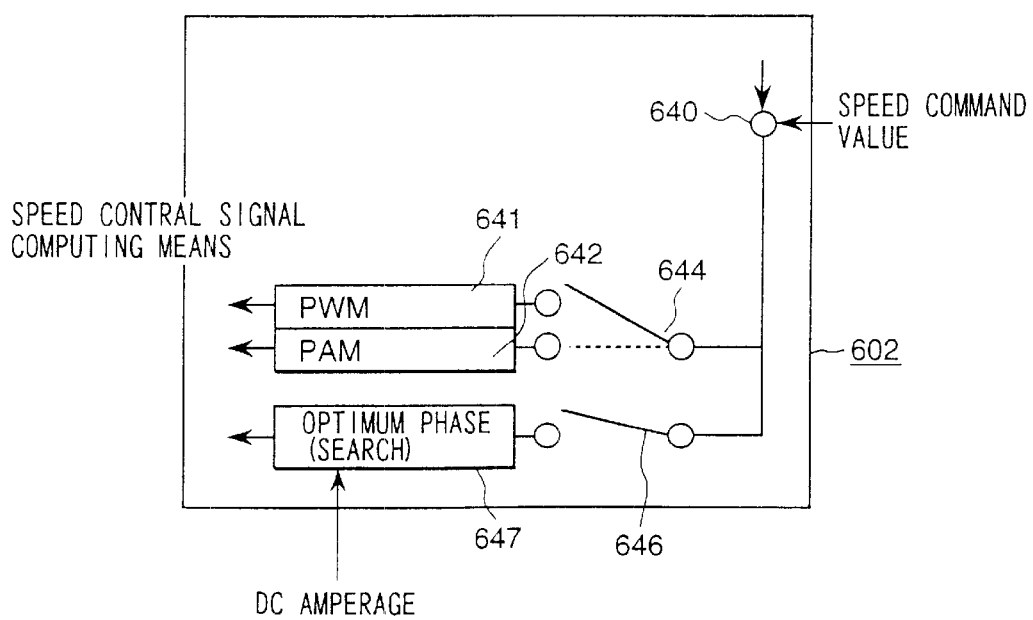
FIG. 14 is a schematic diagram of the speed control signal computing means according to the third embodiment of the invention.

That is to say, as shown in FIG. 14, the speed control signal computing means 602 comprises a DC voltage command section 641, which outputs a DC voltage command to the converter control circuit 62, and a conduction ratio command section 642 which outputs a conduction ratio command to the inverter control circuit 61; and, additionally it includes an optimum commutating phase control section 647, which alters the commutating phase to an optimum value even under the PWM control and PAM control, and a switching section 646.

This embodiment is an improved method of optimum commutating phase control by the optimum commutating phase control section 645 described in connection with the second embodiment, wherein the operation is controlled in line with the optimum commutating phase value automatically, without measuring the optimum commutating phase value of the motor in advance.

Figure 15:
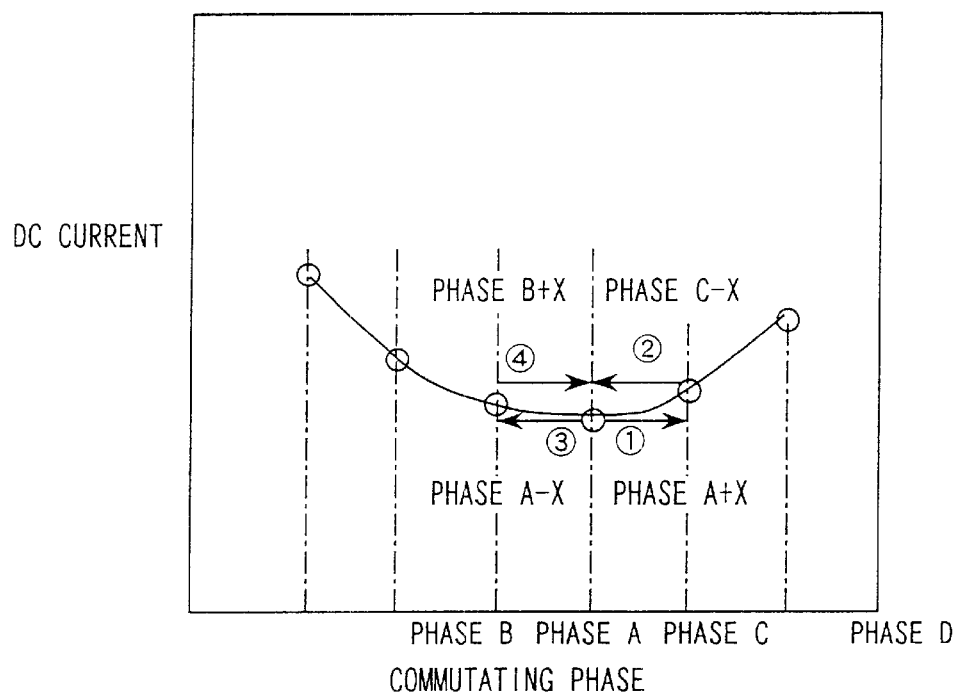
FIG. 15 is a graph showing the commutating phase altering control according to the third embodiment of the invention.

Next, the concept of this control method for controlling the operation in line with the optimum commutating phase value automatically will be explained hereunder with reference to FIG. 15. FIG. 15 shows the characteristic of the DC current versus the commutating phase in the case where a motor is driven using an inverter, while the motor speed and the load torque are constant. As shown in FIG. 15, the minimum DC current is found by varying the commutating phase. In other words, a commutating phase at which the DC current reaches the minimum limit is the optimum commutating phase at which the motor efficiency reaches the maximum.

This embodiment is directed to a method for searching the position at which the DC current reaches the minimum limit by altering the commutating phase. This method is effective only in the case of steady-state operation where the motor speed and the load torque are within a certain variation range.

The operation for searching for the minimum limit of the DC current, which is a characteristic feature of this embodiment, will be explained hereunder with reference to FIG. 15. First, let us assume that a commutating phase is positioned at phase A under a condition wherein the motor speed and the load torque are stable. When the searching operation begins, the phase is lagged by an increment/decrement X, which is preset to phase A, and positioned at phase C. The commutating phase is altered and the speed control is achieved, and then the DC current before altering the commutating phase is compared to that after the alteration, which is step (1). Since the DC current has increased as compared to that at phase A, the phase is leading from phase C by an increment/decrement X and is positioned at phase A, which is step (2). Then, the DC current before altering the commutating phase is compared to that after the alteration as in step (1). Since the DC current has decreased as compared to that at phase C, this time, the phase is further leading from phase A by an increment/decrement X and is positioned at phase B, which is step (3).

When the commutating phase is altered to phase B, the DC current before altering the commutating phase is compared to that after the alteration. Since the DC current has increased, the phase is lagged from phase B by an increment/decrement X, which is step (4).

By repeating the above steps, the commutating phase is controlled to be approximated to the point at which the DC voltage reaches the minimum limit.

Figure 16:
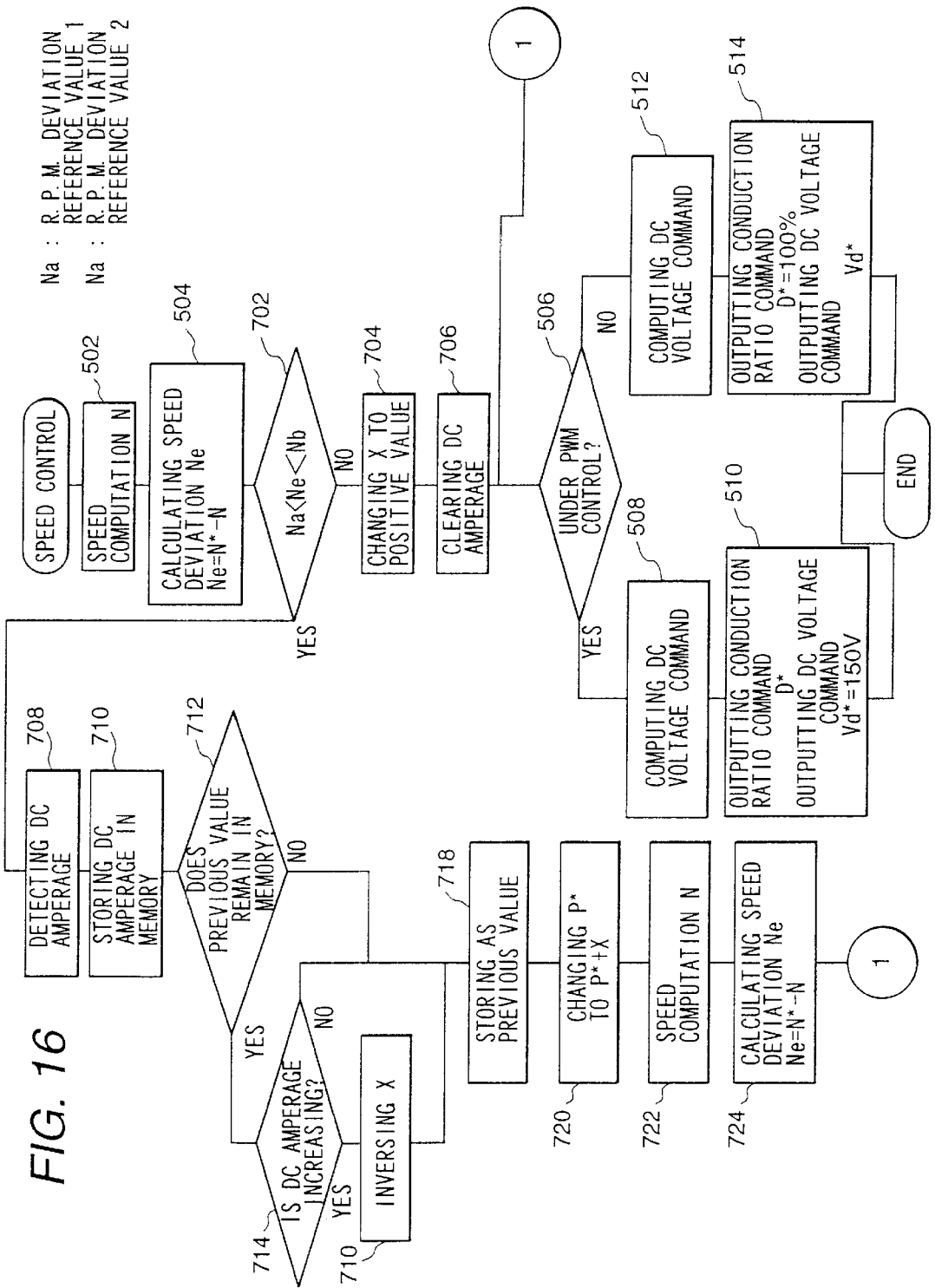
FIG. 16 is a flowchart of the speed control computation according to the third embodiment of the invention.

A flowchart of the speed control computation of the third embodiment is shown in FIG. 16, wherein the above algorithm is applied to the speed computation. The same step number as in FIG. 11 represents the same processing. The explanation hereunder covers the transactions of the processing that are newly added. The description of the speed control computation processing in FIG. 16 is given on the basis of a method that does not employ the commutating phase control in a high-speed operation.

Step (702) judges whether or not the speed deviation calculated in step (504) falls within a preset range. That is, it judges whether or not the motor is in a steady operation where the speed and the load torque are stable.

If the motor is not in a steady operation, the transaction proceeds to step (704) and the increment/decrement X is initialized to a positive value; and then, in the next step (706), the previous value of the DC current is cleared.

If the motor is stable in a steady operation, the transaction proceeds to step (708) and then to step (710), where the DC current at the present phase is detected and stored in memory as the present value.

Step (712) judges whether or not the previous value of the DC voltage is stored in memory. If no previous value is stored in memory, the transaction proceeds to step (718) and the present value is stored in memory as the previous value. If the previous value is stored in memory, whether or not the DC current has increased is judged in step (714) by comparing the previous value to the present value. If the DC current has increased, the transaction proceeds to step (716), where the sign of the increment/decrement X is inverted, and then the transaction proceeds to step (718). If the DC current has not increased, the transaction proceeds directly to step (718).

After the present value is stored in memory as the previous value in step (718), the commutating phase command for alteration is calculated in step (720). In this step, since the sign of the increment/decrement X has been changed as a result of the increase or decrease of the DC current, the increment/decrement can simply be added to the present phase command value. The calculated commutating phase command shall be outputted immediately.

Because the commutating phase command is altered, the speed of the motor varies according to the commutating phase. In steps (722) and (724), the speed is computed and the speed deviation is calculated as in the previous steps (502) and (504). Then, the processing on and after step (506), which is the normal speed control processing, follows and the speed of the motor becomes stable. Thus, the speed control is achieved.

By repeating the above processing cyclically, the commutating phase altering control can be realized.

Figure 17:
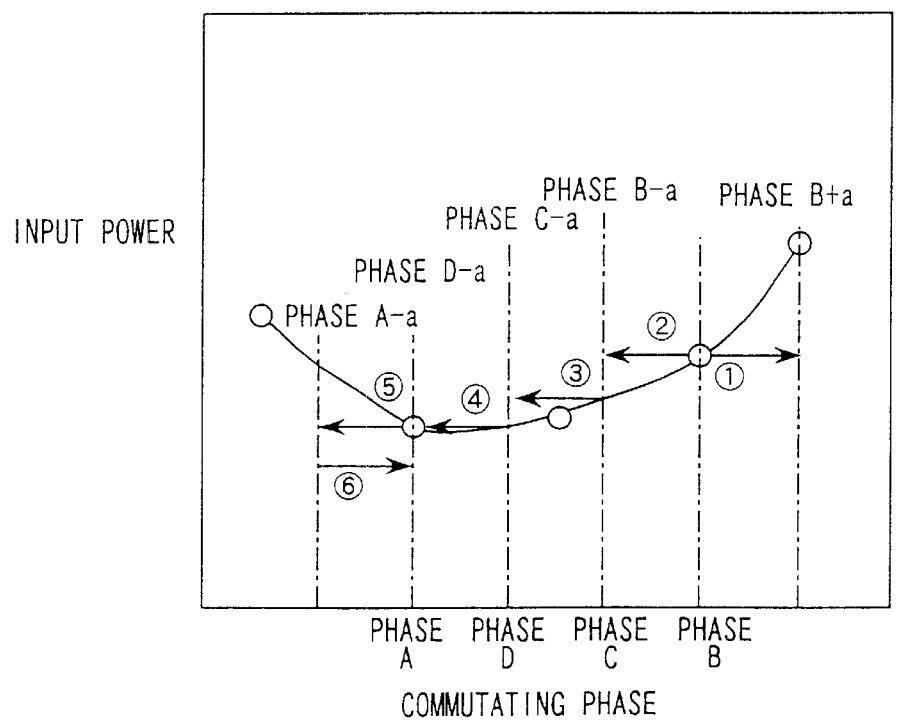
FIG. 17 is a graph showing the commutating phase altering control according to the third embodiment of the invention.

The above embodiment has been described using the DC current as an example, but a similar effect can be obtained by using another value than the DC current, such as the input power, that varies in proportion to the motor output. In particular, if the input power is used, it is possible to optimize not only the motor efficiency, but also the commutating phase in consideration of the overall efficiency of the compressor driving unit. FIG. 17 is an explanatory chart on searching the optimum commutating phase using the input current. Since the operation is similar to that in FIG. 15, no further explanation is given here.

By applying the controller to an inverter air-conditioner, it becomes possible to provide an air-conditioner that has a significantly increased cooling and heating capacity and, at the same time, saves energy. In particular, because the optimum commutating phase can be searched automatically, the above air-conditioner can be provided at a lower cost.

Next, a fourth embodiment of the present invention will be explained briefly hereunder with reference to FIG. 18 to FIG. 20. While this embodiment, like the aforementioned third embodiment, is directed to a method of searching for the optimum commutating phase value, it does not use the DC current or the like, as was used in the third embodiment, for this purpose, but uses the only the motor speed.

Figure 18:
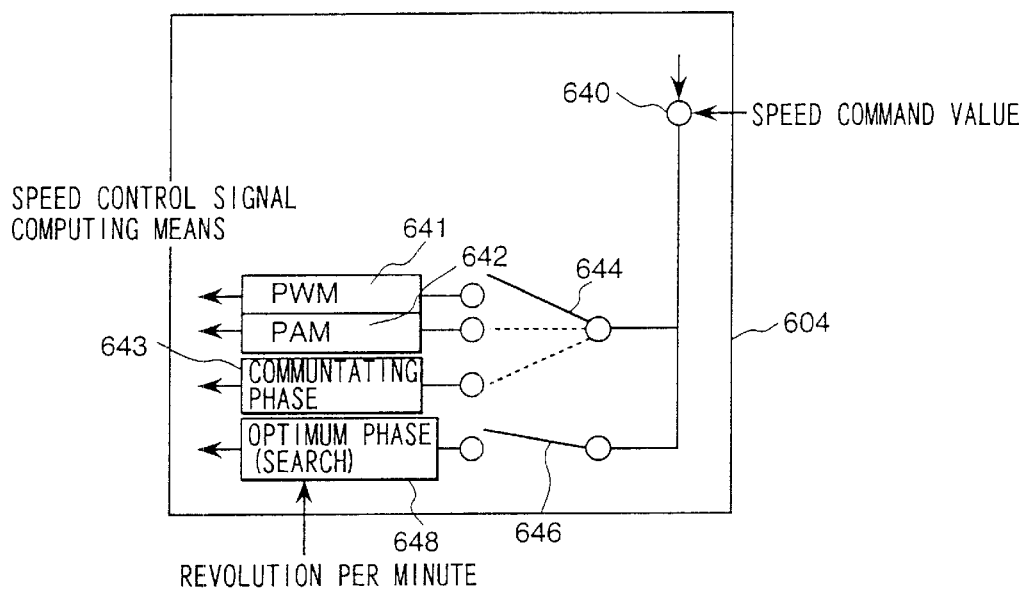
FIG. 18 is a schematic diagram of the speed control signal computing means according to a fourth embodiment of the invention.

FIG. 18 shows a composition of the speed control signal computing means 64 according to the fourth embodiment of the present invention.

The speed control signal computing means 604 comprises three signal generators: a DC voltage command section 641, which outputs a DC voltage command to the converter control circuit 62, a conduction ratio command section 642, which outputs a conduction ratio command to the inverter control circuit 61, and a commutating phase command section 643, which outputs a commutating phase command; and it also includes a switching section 644, which switches these three generators, as well as an optimum commutating phase control section 648, which alters the commutating phase to an optimum value even under PWM control and PAM control, and a switching section 646.

Figure 19:
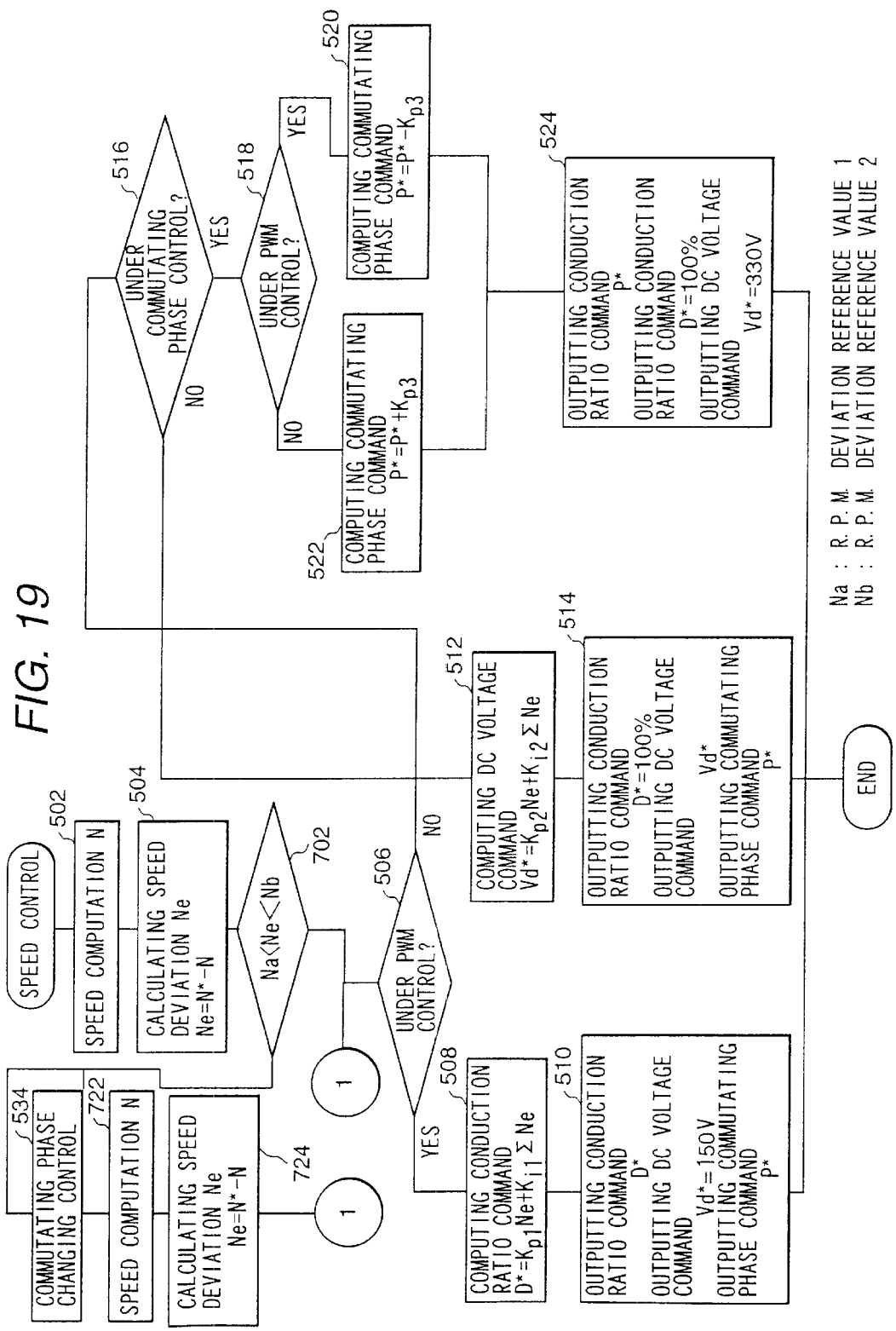
FIG. 19 is a flowchart of the speed control computation according to the fourth embodiment of the invention.

FIG. 19 shows a flowchart of the speed control computation of the fourth embodiment. FIG. 20 shows a flowchart of the commutating phase altering control section for searching the optimum phase actually.

The description of this embodiment is given on the basis of a method that includes the commutating phase control in a high-speed operation as in the first embodiment.

Since a flowchart of the speed control computation shown in FIG. 19 is similar to the previous ones, no further explanation is given here. Only the transaction in step (534) in FIG. 19, representing the commutating phase altering control section, will be explained hereunder with reference to FIG. 19.

Figure 20:
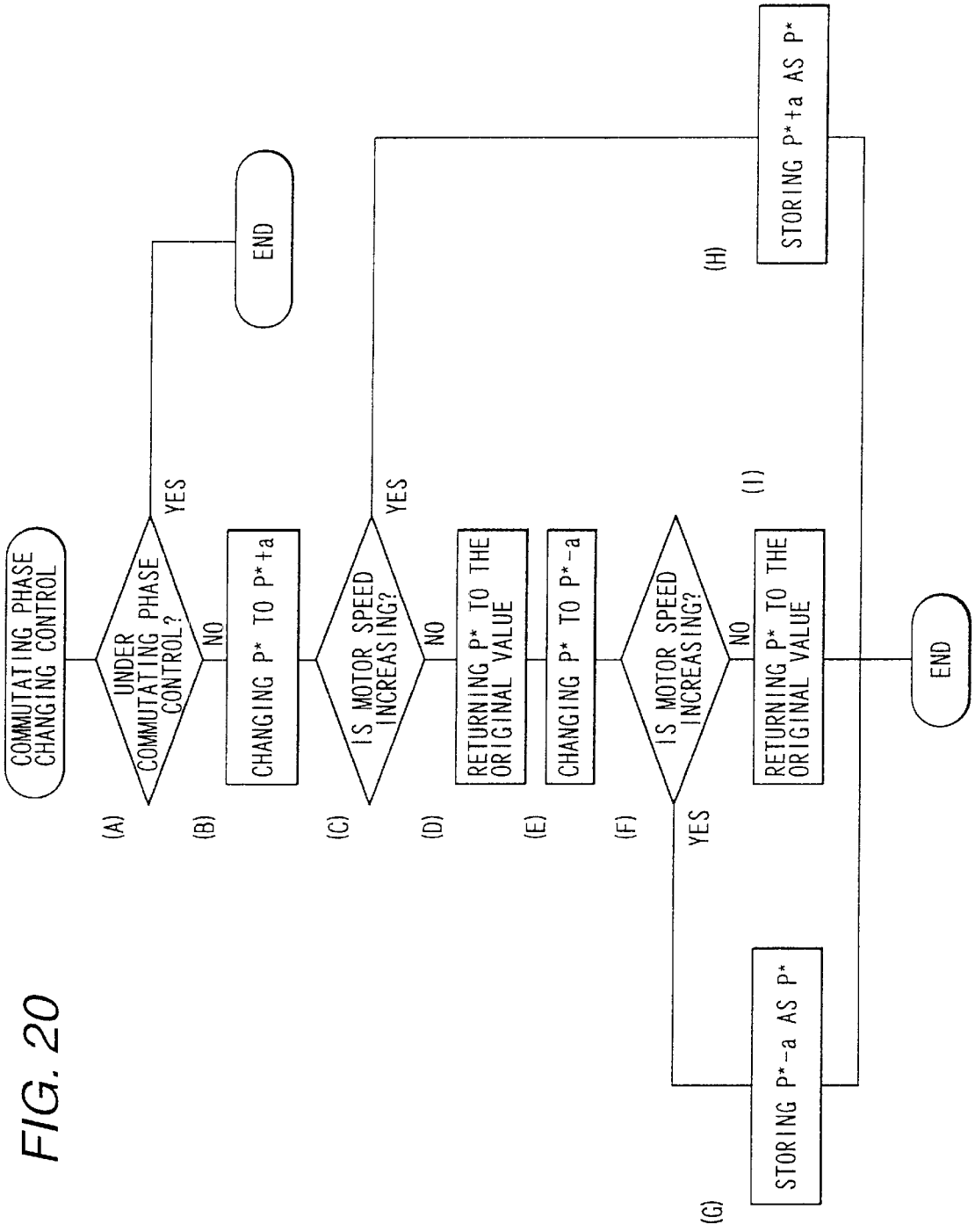
FIG. 20 is a flowchart of the commutating phase altering control according to the fourth embodiment of the invention.

In FIG. 20, step (A) judges whether or not the operation is under commutating phase control in a high-speed range. If it is under commutating phase control, this commutating phase altering control as explained hereunder will not be carried out.

If the operation is not under commutating phase control, the transaction proceeds to step (B) and the commutating phase command is forced to lag by an increment/decrement "a". The commutating phase command is outputted in this step. Then, in step (C), the speed calculated in step (502) of FIG. 19 is compared to that calculated in step (C) of FIG. 20, and whether or not the motor speed has increased is judged.

If the motor speed has increased, the transaction proceeds to step (H), where the commutating phase command altered in step (B) is stored in memory. In this instance, the commutating phase command maintains the value stored in memory.

If the motor speed has not increased, the transaction proceeds to step (D), where the commutating phase command is reset to the original value before the commutating phase altering control. Then, the transaction proceeds to step (E) and, in contrast to step (B), the commutating phase command is forced to lead by an increment/decrement "a". The commutating phase command is outputted in this step.

Once again, in step (F), the speed calculated in step (502) of FIG. 19 is compared to that calculated in step (F), and whether or not the motor speed has increased is judged.

If the motor speed has increased, the transaction proceeds to step (G), where the commutating phase command altered in step (E) is stored in memory. In this instance, the commutating phase command maintains the value stored in memory.

If the motor speed has not increased, the transaction proceeds to step (I), where the commutating phase command is reset to the original value before the commutating phase altering control.

By repeating the above processing at each speed control cycle, the optimum commutating phase can be obtained automatically.

The above commutating phase altering control is directed to a method based on a concept that, if the commutating phase becomes the optimum, in other words, if the motor efficiency is increased by altering the commutating phase, the energy to be generated by the motor becomes excessive, and, as a result, the speed of the motor increases.

Because of this, any other value, including DC voltage and conduction ratio, shall not be altered during the commutating phase altering control. For this reason, this processing is executed before the speed control is executed, as shown in FIG. 19.

As explained above, by applying the third or fourth embodiment to a compressor driving unit, efficient operation can be achieved all the time irrespective of whatever motor is employed. When this unit is used in an air-conditioner, one single program is applicable to all different models of products. Since, as a result, the development time can be shortened and the product cost can be reduced, efficient and low-cost air-conditioners can be provided.

Figure 21:
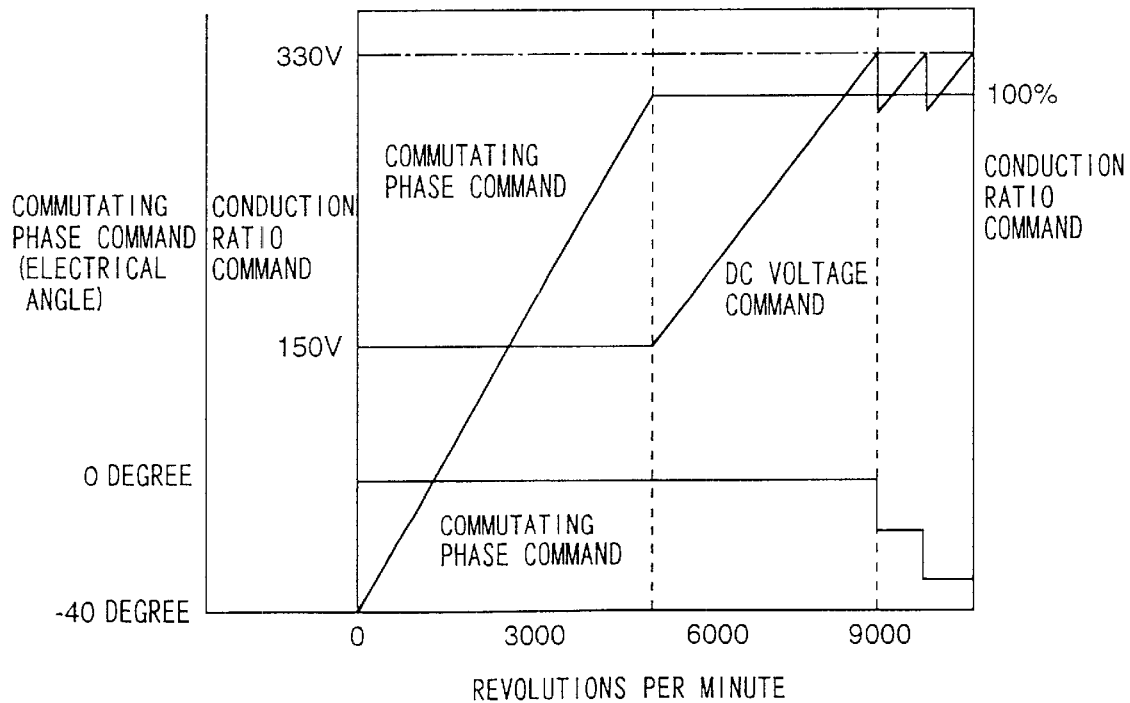
FIG. 21 is an explanatory chart showing the operation of the speed control signal computing means according to a fifth embodiment of the invention.

Next, a fifth embodiment of the present invention will be explained hereunder with reference to FIG. 21. This embodiment is another method that relates to the commutating phase control in a high-speed operation as explained in the first embodiment.

While the first embodiment is a method wherein, after the DC voltage has reached the maximum limit, the speed of a motor is controlled by altering the commutating phase, as shown in FIG. 3, this embodiment is directed to a method wherein, after the DC voltage has reached the maximum limit, the commutating phase is lead extensively at a time and the speed of a motor is controlled by the PAM control.

Although in FIG. 2 it appears as if the final value is obtained by two steps of alteration, more stable speed control can be achieved by more steps of alteration. For a simple unit, however, it is permissible to obtain the final value using a single step. A flowchart of the speed control computation is omitted here.

In the fifth embodiment, a similar effect to that in the first embodiment is obtained. In particular, if the alteration of the commutating phase is achieved by a greater number of steps, the effect seems to be almost the same as in the first embodiment. Besides, in the first embodiment, as the commutating phase. has a lead closer to the final value, the speed variation becomes extensive unless the increment/decrement of the commutating phase is changed, because the variation of the speed is not proportional to the increment/decrement of the commutating phase. In the fifth embodiment, however, because the motor speed is controlled by the DC voltage control, the speed variation can be restricted.

In other words, the method in the first embodiment could be an effective control method if a control a feature is added such that the increment/decrement processing of the commutating phase is not set to a fixed value, but is altered depending upon the absolute value of the phase or the extent of the speed variation.

Figure 22:
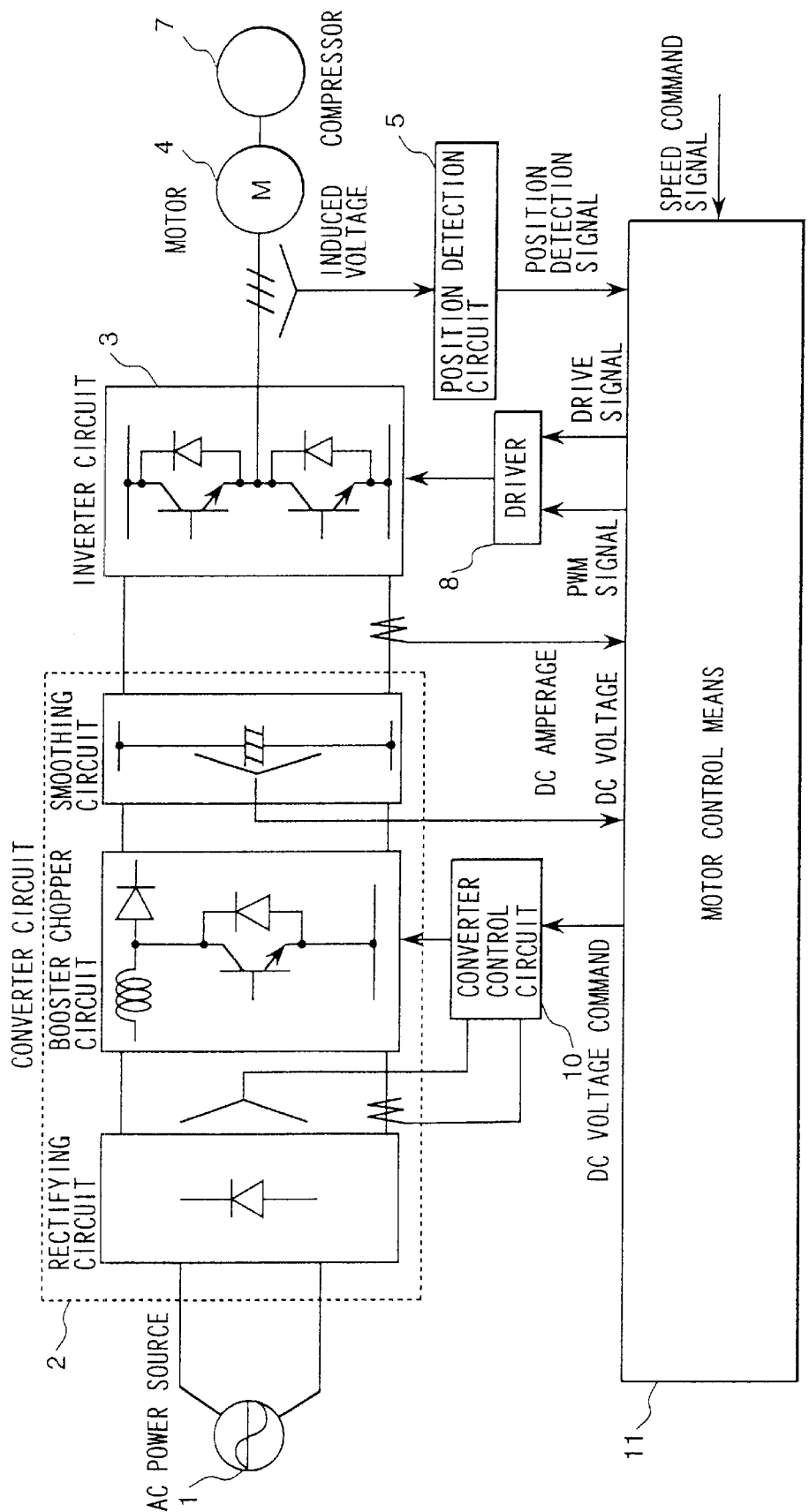
FIG. 22 is a schematic diagram of a compressor driving unit according to another embodiment of the invention.
Figure 23:
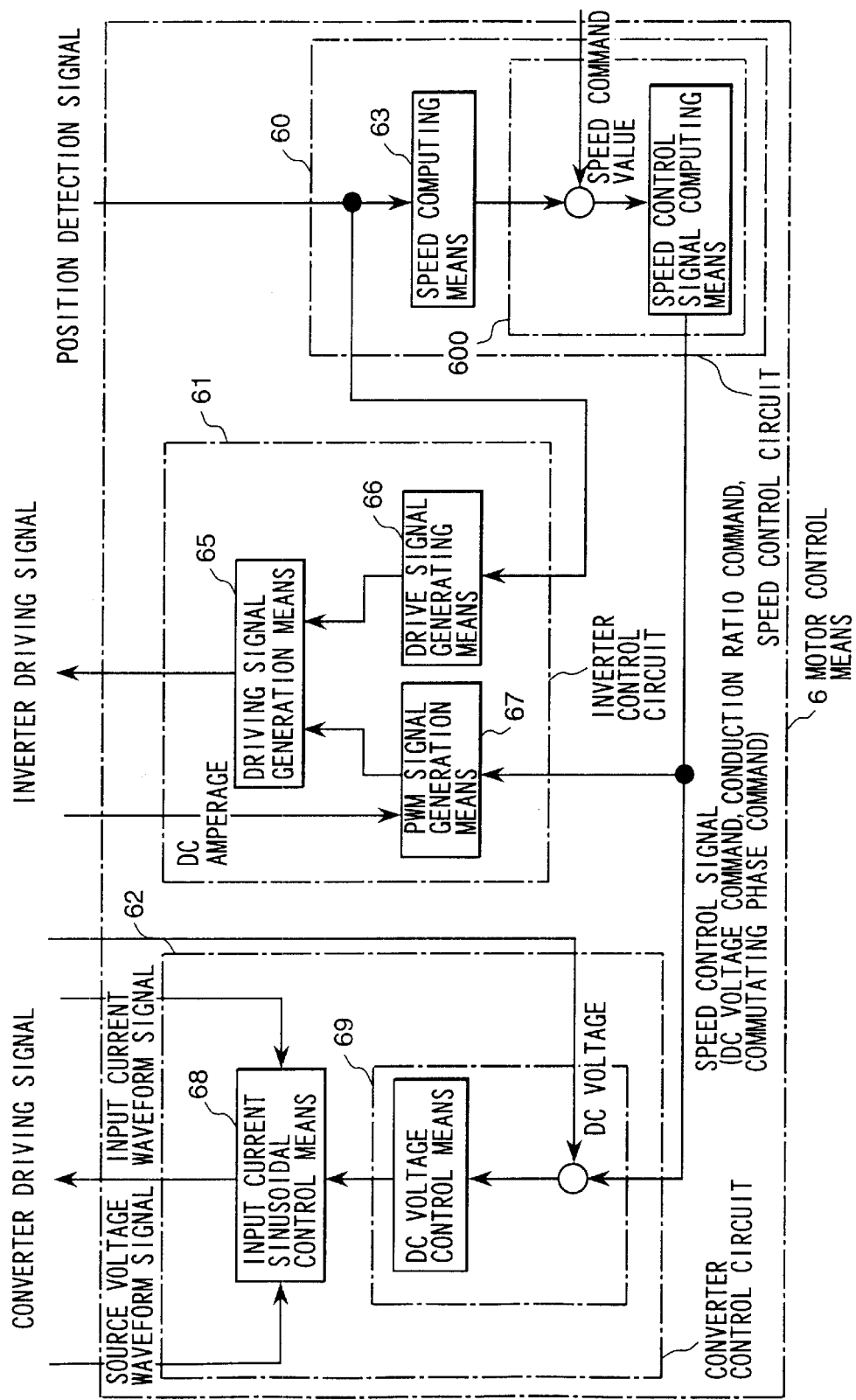
FIG. 23 is a schematic diagram of the motor control means according to the prior art.

Although the above first to fifth embodiments have been explained on the basis of a system equipped with the compressor driving unit shown in FIG. 1, the essence of the invention will not be avoided even if a circuit is employed wherein a dedicated converter control circuit 10 for controlling the converter circuit 2 is added as an external circuit, as shown in FIG. 22. Of late, this type of circuit has been integrated into a dedicated control circuit for improving the power factor, so that the circuit composition in FIG. 22 is more realistic.

According to the present invention, the efficiency can be improved by using a combination of PWM/PAM control and independent phase control. That is, in using a motor controller or a control method for a motor, wherein the motor speed is controlled by switching to/from the PWM control from/to the PAM control, the motor can be so controlled as to be able to operate very efficiently in a wider operation range by altering the commutating timing of the coil of the motor using the commutating phase control means and controlling the motor in such a manner that the efficiency reaches the maximum limit in a steady operation and the speed reaches the maximum limit in a high-speed operation.

The efficiency can be improved particularly by controlling the phase over the entire speed range. Control of the motor speed in a high-speed range is available either by altering the phase or by altering the DC voltage, and efficient operation can be achieved all of the time provided m that it is determined which factor to alter in view of which alteration better improves the efficiency. Besides, a similar effect to the above can be obtained by searching for an optimum phase for the most efficient operation continuously.

As a result, by applying the invention to an inverter air-conditioner, it becomes possible to provide an air-conditioner that has substantially increased cooling and heating capacity and, at the same time, saves energy. In addition, because an optimum commutating phase can be searched automatically, the above air-conditioner can be provided at lower cost.

Also, according to the present invention, high-speed operation of a motor becomes available. That is, a much higher-speed control becomes available by controlling the phase, without increasing the DC voltage above 330 V. As a result, by applying the invention to an air-conditioner or refrigerator, the capacity in a transient operation, such as at the start-up or at the time of a sudden change in the load, can be increased.

Also, according to the present invention, because the design or rated speed of a motor can be decreased, the efficiency in a low-speed operation can be increased. Because the control in a high-speed range leaves some allowance, provided that the maximum motor speed is set constant, the design point of a motor can be lowered. Because of this, the efficiency in a low-speed range can be improved. In addition, by adding PWM/PAM control to the operation, a much higher-efficiency operation becomes available. As a result, by applying the invention to an air-conditioner or refrigerator, the efficiency in a steady-state operation range improves, thereby resulting in a tremendous energy saving and a drastically reduced electric energy cost in a year.

Also, according to the present invention, an inverter module becomes available at lower cost. That is, because the maximum DC voltage can be as low as 330 V or so, a standard inverter module becomes applicable, and hence, a unit can be provided at lower cost. As a result, by applying the invention to an air-conditioner or refrigerator, the cost of each unit can be reduced.

What is claimed is:

1. A motor controller comprising a converter circuit that converts AC power to DC and also increases or decreases DC voltage by a chopper circuit, an inverter circuit connected to an output of the converter circuit, a motor connected to the inverter circuit, and a motor control means that controls a speed of the motor; said motor control means including a speed computing means that computes the speed of the motor based on rotor position data of the motor, a converter control circuit that controls the DC voltage by controlling a switching operation of the chopper circuit, an inverter control circuit that drives the motor by controlling the switching operation of the inverter circuit, and a speed control signal computing means including a DC voltage command section that computes a DC voltage command value so that a deviation between a speed command value and the speed of the motor becomes zero and a conduction ratio command section that computes a conduction ratio command value so that the deviation between a speed command value and the speed of the motor becomes zero, whereby switching the DC voltage command section and the conduction ratio command section in accordance with a load of the motor, wherein an optimal commutating phase control section for altering a phase supplied to a coil of the motor is provided to alter the phase in accordance with the speed or the speed and the load of the motor.

2. A motor controller according to claim 1, wherein the optimal commutating phase control section is used in combination with the DC voltage command section or the conduction ratio command section.

3. A motor controller according to claim 1, wherein phase data previously set by using values of the speed or the speed and the load as a parameter in the optimal commutating phase control section.

4. A motor controller comprising a converter circuit that converts AC power to DC and also increases or decreases DC voltage by a chopper circuit, an inverter circuit connected to an output of the converter circuit, a motor connected to the inverter circuit, and a motor control means that controls a speed of the motor, said motor control means including a speed computing means that computes the speed of the motor based on rotor position data of the motor, a converter control circuit that controls the DC voltage by controlling a switching operation of the chopper circuit, an inverter control circuit that drives the motor by controlling a switching operation of the inverter circuit, and a speed control signal computing means including a DC voltage command section that computes a DC voltage command value so that a deviation between a speed command value and the speed of the motor becomes zero, a conduction ratio command section that computes a conduction ratio command value so that the deviation between a speed command value and the speed of the motor becomes zero, and a commutating phase control section that computes a commutating phase command value so that the deviation between the speed command value and the speed of the motor becomes zero, wherein switching the DC voltage command section, the conduction ratio command section and commutating phase control section is conducted in accordance with the speed or the speed and the load of the motor.

5. A motor controller according to claim 4, wherein the switching for the DC voltage command section, the conduction ratio command section and the commutating phase control section is conducted in accordance with previously set speed or speed and load of the motor.

6. A motor controller comprising a converter circuit that converts AC power to DC and also increases or decreases DC voltage by a chopper circuit, an inverter circuit connected to an output of the converter circuit, a motor connected to the inverter circuit, and a motor control means that controls a speed of the motor; said motor control means including a speed computing means that computes the speed of the motor based on rotor position data of the motor, a converter control circuit that controls the DC voltage by controlling a switching operation of the chopper circuit, an inverter control circuit that drives the motor by controlling a switching operation of the inverter circuit, and a speed control signal computing means including a DC voltage command section that computes a DC voltage command value so that a deviation between a speed command value and the speed of the motor becomes zero, and a conduction ratio command section that computes a conduction ratio command value so that that the deviation between a speed command value and the speed of the motor becomes zero, and switching of the DC voltage command section and the conduction ratio command section is conducted in accordance with the load of the motor, wherein a commutating phase control section for altering a phase supplied to a coil of the motor is provided and the speed of the motor is controlled by using the DC voltage command section in accordance with the alteration of a commutating phase in the commutating phase control section.

7. A motor controller according to claim 6, wherein the commutating phase control section alters the commutating phase when the DC voltage command section or the DC voltage reaches a predetermined value.

* * * * *